US011067226B2

(12) United States Patent
Rizopoulos et al.

(10) Patent No.: US 11,067,226 B2
(45) Date of Patent: Jul. 20, 2021

(54) VAPORIZATION SYSTEMS AND METHODS OF USING THE SAME

(71) Applicants: John Rizopoulos, Sugar Land, TX (US); Zupeng Huang, Pearland, TX (US); Scott Schroeder, Houston, TX (US)

(72) Inventors: John Rizopoulos, Sugar Land, TX (US); Zupeng Huang, Pearland, TX (US); Scott Schroeder, Houston, TX (US)

(*) Notice: Subject to any disclaimer, the term of this patent is extended or adjusted under 35 U.S.C. 154(b) by 651 days.

(21) Appl. No.: 15/150,207

(22) Filed: May 9, 2016

(65) Prior Publication Data

US 2016/0363049 A1    Dec. 15, 2016

Related U.S. Application Data

(60) Provisional application No. 62/158,820, filed on May 8, 2015.

(51) Int. Cl.
*F17C 9/02* (2006.01)
*F17C 7/04* (2006.01)
*F02C 3/22* (2006.01)

(52) U.S. Cl.
CPC ............ *F17C 9/02* (2013.01); *F02C 3/22* (2013.01); *F17C 7/04* (2013.01); *F17C 2221/033* (2013.01); *F17C 2225/0123* (2013.01); *F17C 2270/0581* (2013.01); *Y02E 20/16* (2013.01)

(58) Field of Classification Search
CPC ...... F17C 7/04; F17C 7/02; F17C 9/04; F17C 9/02; F17C 2270/0581; F17C 2225/0123; F17C 2221/033; F28D 15/0266; F28D 15/0275; F02C 3/22; F01K 23/10
USPC ......................................................... 62/50.2
See application file for complete search history.

(56) References Cited

U.S. PATENT DOCUMENTS

| | | | | |
|---|---|---|---|---|
| 3,587,725 A | * | 6/1971 | Basisiulis | F28D 15/046 165/104.26 |
| 3,881,962 A | | 5/1975 | Rubinstein | 136/209 |
| 3,958,627 A | | 5/1976 | Edelstein | 165/273 |
| 4,426,959 A | * | 1/1984 | McCurley | F28D 15/0275 122/33 |
| 4,434,004 A | * | 2/1984 | Ratschat | F28D 15/0275 165/104.21 |
| 4,645,904 A | | 2/1987 | Moraski et al. | 392/401 |
| 5,209,634 A | | 5/1993 | Owczarek | 415/150 |
| 5,275,232 A | | 1/1994 | Adkins et al. | 165/104.26 |
| 2003/0005698 A1 | | 1/2003 | Keller | 60/643 |

(Continued)

FOREIGN PATENT DOCUMENTS

| | | |
|---|---|---|
| AU | 17383/76 A | 8/1976 |
| CA | 2222607 C | 8/2006 |
| JP | 60101397 A * | 6/1985 ............... F17C 9/02 |

OTHER PUBLICATIONS

Cengel, Yunus A. Heat Transfer: A Practical Approach, 2nd Edition, 2003. pp. 546-550.*

(Continued)

*Primary Examiner* — Tavia Sullens
(74) *Attorney, Agent, or Firm* — Norton Rose Fulbright US LLP

(57) ABSTRACT

Embodiments of the invention relate to vaporizer systems including two-phase heat transfer devices for vaporizing liquids and methods of using the same.

15 Claims, 14 Drawing Sheets

(56) References Cited

U.S. PATENT DOCUMENTS

| | | | |
|---|---|---|---|
| 2006/0242969 A1 | 11/2006 | Minton et al. .................. | 62/50.2 |
| 2013/0008188 A1* | 1/2013 | McCormick ........ | F28D 15/0275 |
| | | | 62/53.2 |
| 2013/0008631 A1* | 1/2013 | Newman ............. | F28D 15/0275 |
| | | | 165/104.26 |

OTHER PUBLICATIONS

Vessel ('vɛs l) from Collins English Dictionary. HarperCollins Publishers 1991, 1994 (Third updated edition), 1998, 2000, 2003, 2005, 2006, 2007, 2009, 2010, 2011, 2014 . Accessed Sep. 2019.*

Top 10 Alternative Fuels on the Road Right Now: 2 Liquid Nitrogen, <https://auto.howstuffworks.com/fuel-efficiency/hybrid-technology/10-alternative-fuels-on-the-road9.htm>. Accessed Mar. 28, 2020.*

English Machine Translation: JP 60101397. Accessed Mar. 11, 2020.*

* cited by examiner

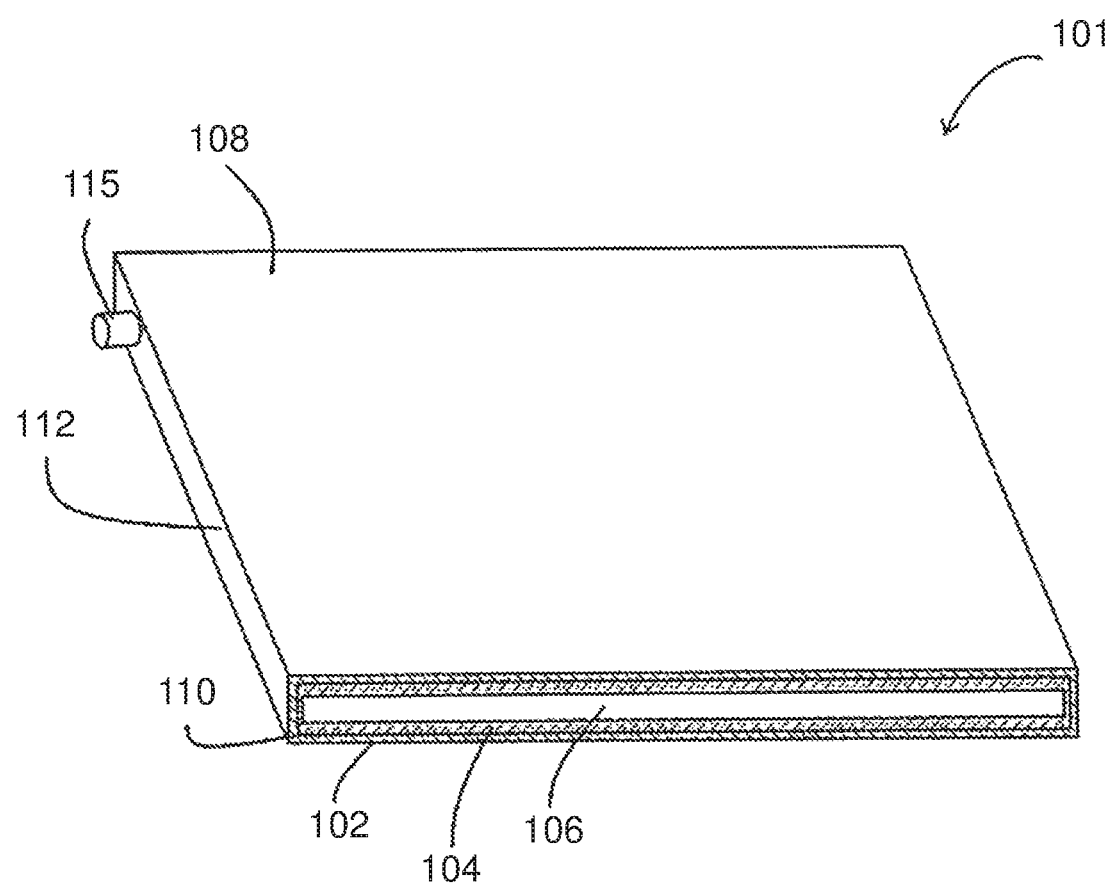
FIG. 1A(ii)

VAPORIZATION SYSTEMS AND METHODS OF USING THE SAME

CROSS-REFERENCE OF RELATED APPLICATION

This application claims the benefit of U.S. Provisional Application No. 62/158,820 filed May 8, 2015. The content of the referenced application is hereby incorporated by reference into the present application.

FIELD

The present disclosure relates to the vaporization of a liquefied fuel, such as Liquid Natural Gas (LNG), and more particularly to systems and methods that utilize waste heat to vaporize the fuel.

BACKGROUND

Natural gas is a plentiful and relativity clear burning fuel. In the gaseous state it is typically transported through pipeline networks. When pipeline network connections do not exist between the source and end-user, natural gas is typically liquefied for transportation. Liquefaction greatly increases the energy density compared to the gaseous state allowing cost effective transportation, however this process requires refrigeration to very low temperatures, typically around −162° C. for storage at atmospheric pressure, and vaporization back to ambient temperature before it can be utilized by the end-users.

Liquefied natural gas ("LNG") is typically transported to a storage facility where it is vaporized back into gaseous form and fed into a pipeline network for use. Vaporization involves heating the LNG from cryogenic temperature back to near ambient temperatures. Common vaporization systems include: Open Rack Vaporizers, which use seawater as a heating medium to heat and vaporize the LNG; Submerged Combustion Vaporizers, which use a water bath heated by flue gas as a heating medium to heat and vaporize the LNG; and Intermediate Fluid Vaporizers, which use a shell and tube vaporizer in a closed loop to heat and vaporize the LNG via a heated intermediate fluid that is passed through the shell over the tube(s) having LNG. The Intermediate Fluid Vaporizer system uses rotating equipment (e.g., pumps and/or expanders) to move the intermediate fluid from one portion of the closed loop to another. There are also other less common types of vaporization systems, such as Ambient Air Vaporizers, which are typically seen in smaller facilities. Ambient air vaporizers use long vertical tubes and a downward air draft as a heating medium to vaporize the LNG in the tubes.

Some of the drawbacks of the above mentioned systems include: the requirement to pump the seawater, requiring power and maintenance for pumps, the difficulty of preventing fouling and corrosion from seawater, and that the cold seawater discharge (often with anti-fouling and anti-corrosion additives) may negatively impact the environment; the necessity of burning fuel and subsequently producing emissions, the flue gas will make the bath water acidic and caustic addition is required to maintain the pH of the bath and excess water discharge, and an air blower and burner management system is required; or the need to have extra units to allow for defrosting creates a larger overall unit, formation of fog, and the requirement to have a relatively high ambient air temperature.

Against this backdrop, the present disclosure was developed.

SUMMARY

Embodiments described herein relate to vaporizer systems including two-phase heat transfer devices for vaporizing liquids such as fuels and methods of using the same.

Some embodiments include an apparatus for vaporizing a liquefied fuel that comprises a two phase heat transfer device and an evaporator. The evaporator can be configured for vaporization of a liquefied fuel and can comprise an inlet configured to couple to a liquefied fuel source and an outlet configured for gaseous fuel to exit the evaporator, wherein the inlet is in fluid communication with the outlet. The two-phase heat transfer device can comprise a jacket, the jacket having a first end and a second end and defining a chamber therebetween, the jacket configured to contain a working fluid. The two-phase heat transfer device can be configured to couple to the evaporator such that the first end of the jacket is in thermal communication with the liquefied fuel in the evaporator and configured to couple to a duct such that the second end of the jacket is in thermal communication with fluid (e.g., gas or liquid) passing through the duct. The two-phase heat transfer device configured such that the working fluid can circulate between the first end and the second end as the working fluid transitions between a gas phase and a liquid phase. A duct defines a conduit through which a fluid flows. The duct can be part of an exhaust system or an air intake system. Other embodiments can include methods of using the apparatus.

Still other embodiments can include a method of vaporizing a liquefied fuel utilizing heat from an exhaust after the exhaust has already passed through one or more heat exchanges. Such methods can comprise heating a working fluid contained within a sealed jacket with heat from an exhaust passing through an exhaust system such that the working fluid vaporizes and heating a liquefied fuel with the heat from the working fluid such that the working fluid condenses and the liquefied fuel vaporizes, wherein the heat from the exhaust is transferred to the working fluid after heat from the exhaust was transferred to one or more heat exchangers, such as one, two, three, four, five, six, seven, or more heat exchangers. The exhaust system can be coupled to a gas turbine. In embodiments, the gaseous fuel formed from heating the liquefied fuel can be used to drive a gas turbine.

Other embodiments can include a method of vaporizing a liquefied fuel utilizing heat from a steam turbine exhaust. Such methods can comprise heating a working fluid contained within a sealed jacket with heat from the steam turbine exhaust such that the working fluid vaporizes and heating a liquefied fuel with the heat from the working fluid such that the working fluid condenses and the liquefied fuel vaporizes. In embodiments, a second jacket can transfer heat from an exhaust of a gas turbine, such as in a combined cycle power plant.

Yet other embodiments can include a method of vaporizing a liquefied fuel utilizing heat from an air intake of a compressor. Such embodiments can comprise heating a working fluid contained within a sealed jacket with heat from the air intake of the compressor such that the working fluid vaporizes and heating a liquefied fuel with the heat from the working fluid such that the working fluid condenses and the liquefied fuel vaporizes. The air compressor can be coupled to a gas turbine, such as in a combined cycle power plant.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The drawings illustrate several embodiments of the invention, wherein identical reference numerals refer to identical or similar elements or features in different views or embodiments shown in the drawings.

FIG. 1A(ii) is a cross-sectional view of a two-phase heat transfer device according to another embodiment.

DETAILED DESCRIPTION

A common drawback of typical vaporizer systems used in a full LNG import terminal is the complexity of the designs, as most require rotating equipment, such as pumps or expanders, which come with operating and maintenance costs. In geographically isolated areas such as small islands, the cost and complexity of a full import terminal configuration is prohibitive. Advantageously, a simplified vaporizer system design, such as a system disclosed herein, would suit the needs of the emerging small market LNG user such as those where direct access to a large natural gas pipeline is unavailable or impractical.

Embodiments of the invention relate to vaporizer systems and apparatuses including two-phase heat transfer devices for vaporizing liquefied fuels and methods of using the same. Specific embodiments relate to vaporizer systems, apparatuses, and methods including one or more two-phase heat transfer devices comprising propane as a working fluid, whereby the vaporizer system is used to vaporize liquefied natural gas in an energy efficient and less environmentally impactful manner than traditional LNG vaporization systems by using waste heat from co-located heat sources.

The systems, apparatuses, and methods herein use a working fluid (e.g., propane) enclosed in each of one or more two-phase heat transfer devices to exchange heat with a liquefied fuel (e.g., LNG) along at least one section of each two-phase heat transfer devices, resulting in condensation of the working fluid and vaporization of the liquefied fuel. Such heat exchange with the liquefied fuel may be carried out anywhere in a system between a liquefied fuel storage facility and immediately prior to the liquefied fuel being used as a fuel at an end-use site. At a second portion of each of the two-phase heat transfer devices, the working fluid exchanges heat with a warmer fluid, such as a high-temperature fluid, resulting in evaporation of the working fluid. Such evaporation can be carried out near any source of heat, such as at any co-located waste or low-grade heat sources associated with the system. The working fluid circulates between the first and second portions of the two-phase heat transfer device, thereby allowing a cyclical heating and cooling of the working fluid and vaporization of the liquefied fuel. The systems and methods disclosed herein may utilize one or more two-phase heat transfer devices in parallel and/or in series.

Figure 1A:
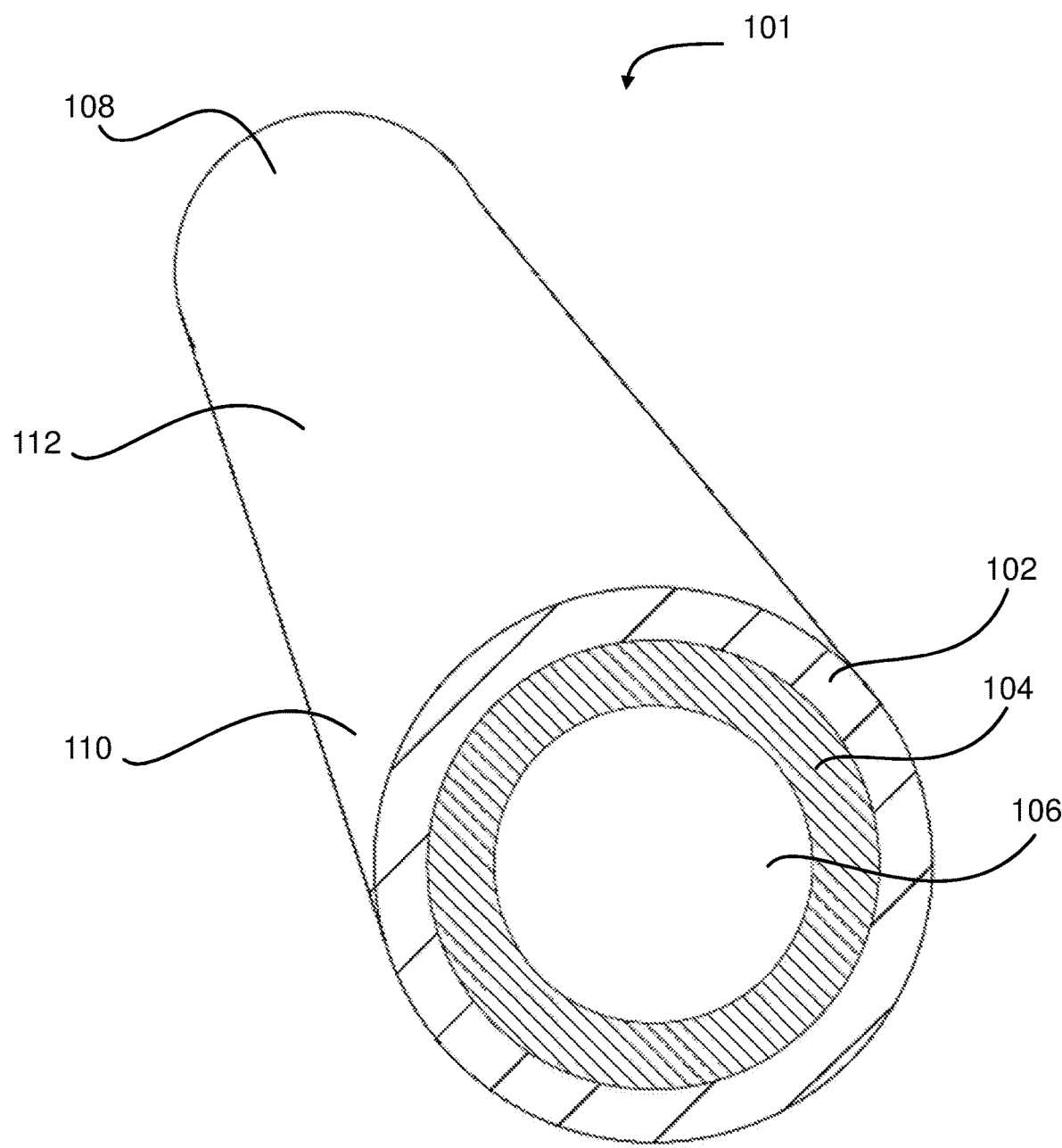
FIG. 1A(i) is a cross-sectional view of a two-phase heat transfer device according to an embodiment.

FIGS. 1A(i) and 1A(ii) illustrate a two-phase heat transfer device 101. Two-phase heat transfer device 101 includes a jacket 102 defining a chamber 106. Optionally, the two-phase heat transfer device 101 may include a wick 104 inside of the jacket 102, through which a working fluid (not shown) may flow. The working fluid may be disposed in at least portion of one or both of the chamber 106 and the wick 104, when present. The two-phase heat transfer device 101 includes a condensing side 108 and an evaporation side 110. The condensing side 108 and the evaporation side 110 may be separated by one or more substantially adiabatic sections 112 of the two-phase heat transfer device 101. During use, the working fluid in the evaporation side 110 of the two-phase heat transfer device 101 absorbs heat from an external heat source, evaporating the working fluid therein. The evaporated working fluid travels away from the evaporation side by convection or pressure differential. The evaporated working fluid travels to the condensing side 108 where it transfers heat to an external heat sink (e.g., liquefied fuel) thereby condensing the working fluid. The condensed working fluid may travel back to the evaporation side 110 by one or more of gravity, convection, centrifugal force, capillary force or flow (e.g., through the wick 104), or acceleration forces. The jacket 102 of the two-phase heat transfer device 101 may include one or more substantially adiabatic sections 112 interposed between the condensing side 108 and the evaporation side 110, wherein the heat transfer into or out of the two-phase heat transfer device 101 is at least limited or reduced compared to the condensing side 108 or the evaporation side 110. While depicted in FIGS. 1A(i) and (ii) as a cross section, the jacket 102 is closed at both ends, such as by an end cap, thereby making the two-phase heat transfer device 101 a closed fluid system capable of heat transfer with external environments.

In embodiments, the jacket 102 can be configured to be vacuum sealed. For example, the jacket can comprise a sealable port 115 shown in FIG. 1A(ii). Through port 115, a vacuum can be applied. Working fluid can then be transferred into the jacket 102 and port 115 can be closed.

The jacket 102 may be made from any thermally conductive material suitable for use at the desired temperature range. A thermally conductive material can have a conductivity of at least 50, 100, 150, 200, 250, 500, 1000, 2000, 2500, 3000, 3500, 4000, 4500, 5000, 5500, 6000, 6500, 7000, or 7500 $W \cdot m^{-1} \cdot K^{-1}$. In embodiments, a thermally conductive material can have a conductivity of at least 200 $W \cdot m^{-1} \cdot K^{-1}$. In embodiments, a thermally conductive material can have a conductivity of at least 1000 $W \cdot m^{-1} \cdot K^{-1}$. For example, suitable materials for the jacket 102 can include copper, steel (e.g., stainless steel), silver, gold, nickel alloys (e.g., Monel or Inconel), aluminum, refractory metals (e.g., titanium), or any other material compatible with and suitable for containing a pressurized fluid and conducting heat therethrough. In embodiments, jacket 102 can consist of metals selected from aluminum, copper, silver, or gold.

The jacket 102 can have a variety of sizes and configurations suitable for permitting a liquid to be vaporized at one end and travel to another end for condensation. The jacket 102 can exhibit any cross-sectional shape including one or more of circular, rectangular, triangular, elliptical, or combinations of any of the foregoing, such as a rectangular cross-section along one portion and a circular cross-section at another portion. In some embodiments, a cross-sectional shape may be selected and configured to provide a desired ratio of surface area of the outer surface of the jacket 102 to volume of the working fluid within the jacket 102. The jacket 102 can have a maximum cross-sectional width of at least 0.25 inches, such as about 0.25 inches to about 100 inches, about 1 inch to about 50 inches, about 1 inch to about 12 inches, about 3 inches to about 9 inches or about 5 inches to 7 inches. The width of the jacket 102 can be selected based on the wall thickness of the jacket 102, the jacket material, the working fluid, the liquefied fuel, the desired heat transfer between the working fluid and the process fluid, the length of the two-phase heat transfer device 101, the external heat source, or combinations of any of the foregoing. For a two phase heat transfer device 101 that is a heat pipe, the length can be greater than the width and the depth, and the width and depth can be relatively close in value, such as that shown in FIG. 1A(i). For a two phase heat transfer device 101 that is a vapor chamber, the length and width can be greater than the depth, such as that shown in FIG. 1A(ii). The length of each two-phase heat transfer device 101 may be selected based on any of the above criteria including the width of the two-phase heat transfer device 101. The length of each two-phase heat transfer device 101 may be 1 foot or more. For example, the length of two-phase heat transfer device 101 can be any amount between about 1 foot to about 1000 feet, about 10 feet to about 500 feet, about 100 feet to about 300 feet, about 20 feet to about 100 feet, about 20 feet to about 50 feet, or about 175 feet to about 225 feet.

While depicted as linear in FIGS. 1A(i) and (ii), two-phase heat transfer devices may include any number of curved, angled, and/or linear sections therein. In an embodiment, a two-phase heat transfer device 101 may split into one or more branches at one or more of the condensing side 108, the evaporation side 110, or an intermediate portion therebetween. In an embodiment, the jacket 102 can have one or more flutes, fins, or other extending features configured to provide a larger surface area to the two-phase heat transfer device 101. The extending features may extend (e.g., radially or laterally) away from the jacket 102. For example, an array of parallel fins may extend outward from one or more portions of the jacket 102 such as at one or more of the condensing side 108 or the evaporation side 110.

In some embodiments, the optional wick 104 may be disposed along an inner surface of jacket 102. The wick 104 can line the entire length or be in only a portion of the jacket 102, such as along a discrete length and/or circumference of the jacket 102. The wick 104 may be any known wicking material and may be selected based upon one or more of the type of working fluid, the jacket material, the desired capillary flow in the two-phase heat transfer device 101, or the operating temperature range of the two-phase heat transfer device. In an embodiment, the wick 104 may include a material separate and distinct from the jacket 102. In an embodiment, the wick 104 may include one or more axially extending grooves (e.g., microgrooves or channels) formed in the inner surface of the jacket 102. The wick 104 can be a sintered powder or wire mesh coupled to the inner surface. The wick 104 may exhibit a substantially uniform thickness along the length of the two-phase heat transfer device 101. In some embodiments, the wick 104 can be disposed in the two-phase heat transfer device 101 in an increasing thickness along the length thereof. The thickness of the wick 104 can increase from a minimum thickness at or near the evaporation side 110 to a maximum thickness at or near the condensing side 108. The size of the chamber 106 can be substantially uniform throughout the two-phase heat transfer device or can vary along portions of the length of the two-phase heat transfer device 101, such as adjacent to portions of the two-phase heat transfer device having varying wicking material thicknesses. In an embodiment, the chamber 106 may include one or more microgrooves or microchannels about the periphery of the internal wall of the jacket 102.

The working fluid can include any fluid suitable for the range of temperatures of a particular liquefied fuel and application, such as, but not limited to, helium, hydrogen, oxygen, water, organic fluids (e.g., methane, propane, propylene, acetone, or alcohols), ammonia, noble gasses, halogenated-hydrocarbon (e.g., halocarbons such as chlorofluorocarbons) or other refrigerants (e.g., R-13, R-500, duPont® Suva® 95), or mixtures of any of the foregoing. In embodiments, the working fluid can have boiling point between −100° C. to 0° C. and a melting point less than −170° C. For example, a liquefied fuel may be LNG and the working fluid may comprise propane. Propane is desirable for such an application because propane does not freeze, like water (even seawater), at the temperatures at which natural gas is in liquid form—below about −160° C. at atmospheric pressure. The melting point of propane is −188° C. Further, propane has a boiling point at a temperature—above about −42° C. at atmospheric pressure—sufficient to allow efficient use in a two-phase heat transfer device configured to at least partially vaporize LNG.

The condensing side 108 can be in contact with or near the LNG to vaporize the LNG, such as in or next to a tank or line containing LNG. At the condensing side, the heat from the evaporated propane transfers through the jacket 102 to the LNG, thereby heating the LNG and condensing the propane which travels back to the evaporation side 110. At the evaporation side 110, the jacket 102 and condensed propane therein is exposed to an external heat source (e.g., an exhaust of gas turbine or steam turbine or compressor air intake) effective to cause the condensed propane to evaporate and travel back to the evaporation side 110. As explained in more detail below, sources of external heat (e.g., hot exhaust gas, hot flue gas, warm intake air, etc.) may include sources of waste or low-grade heat in processes related to the use of natural gas (e.g., energy production).

Figure 1B:
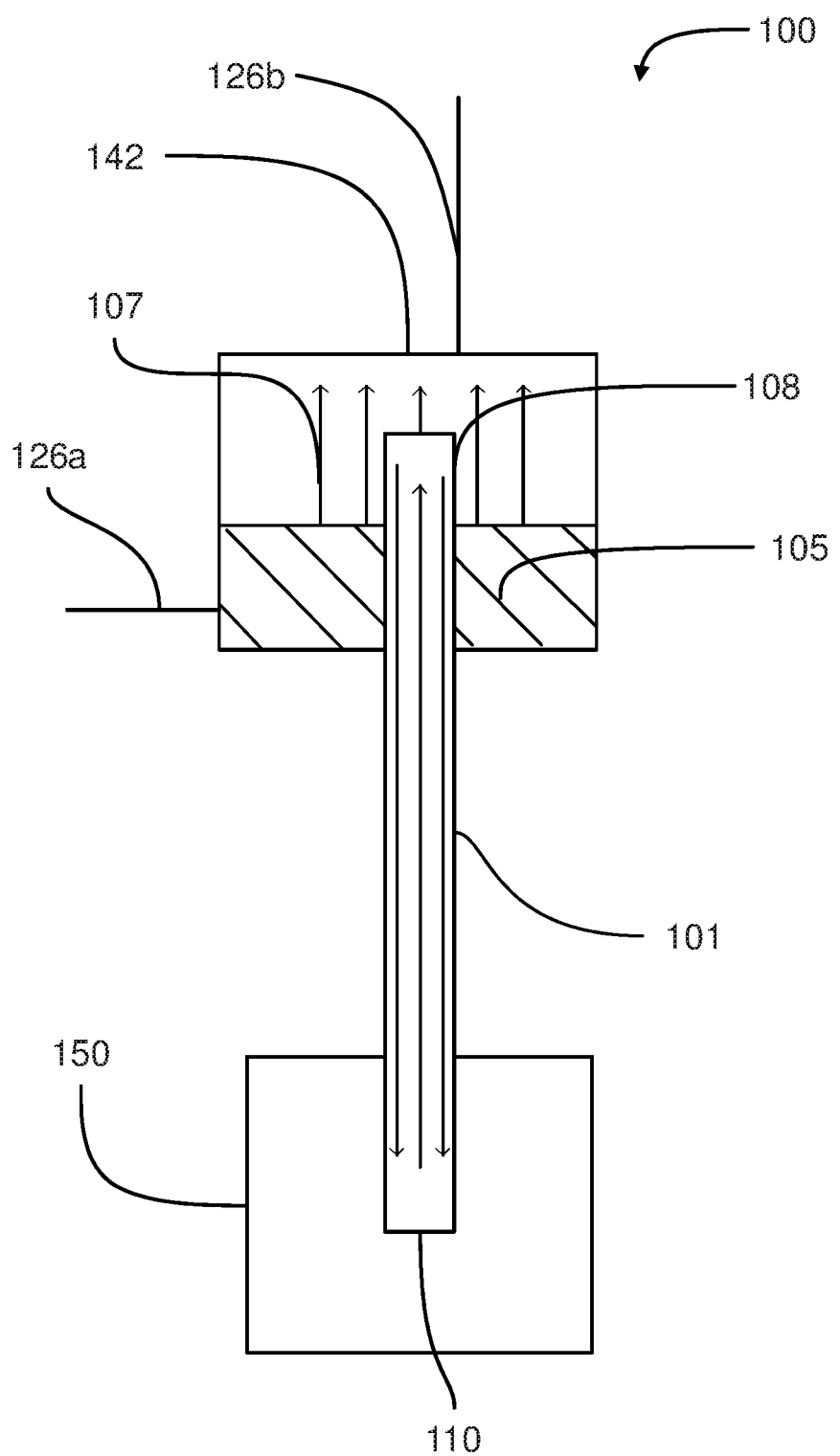
FIG. 1B is a schematic diagram of a vaporizer system for vaporizing a liquefied fuel with a two-phase heat transfer device.

FIG. 1B is a schematic diagram of a vaporizer system according to an embodiment. The vaporization system 100 includes one or more two-phase heat transfer devices 101. The working fluid used in the system may comprise propane. The one or more two-phase heat transfer devices 101 may extend between a vaporizer 142 and a heat source 150. The condensing side 108 of the two-phase heat transfer device 101 may be in thermal communication with the vaporizer 142. In some embodiments, the condensing side 108 can be positioned inside of, in contact with, or adjacent to the vaporizer 142. The vaporizer 142 may be at least partially filled with the liquefied fuel 105 (e.g., a fuel such as LNG). The liquefied fuel 105 may be provided to the vaporizer 142 by an inlet side 126a of a fuel line fluidly connected thereto. The working fluid in the condensing side 108 may transfer heat to the liquefied fuel 105 in the vaporizer 142, thereby volatilizing or vaporizing the liquefied fuel 105 to a vaporized fuel 107 (e.g., LNG to vaporized natural gas) while condensing the working fluid. The condensed working fluid travels back to the evaporation side 110 of the two-phase heat transfer device 101 via one or more of convection, centrifugal force, gravitational force, capillary force, or acceleration force. The evaporation side 110 of the two-phase heat transfer device is in thermal communication with a heat source (e.g., proximate to a warmer fluid such that heat is exchanged therebetween), such as hot flue gasses, a warm or ambient air inlet, steam exhaust, etc. Thermal communication may be direct thermal communication (e.g., directly contacting the warmer fluid) or indirect thermal communication (e.g., via one or more thermally-conductive components coupled to the items that are said to be in thermal communication or via a liquid heated by a heated source). In embodiments, the evaporation side 110 may be coupled to a duct (e.g., a flue, an exhaust manifold, a stack, an air intake duct, an air intake manifold, or the like) such that it is in thermal communication with the fluid passing through the duct. The condensed working fluid in the two-phase heat transfer device absorbs heat from the heat source to which it is coupled, thereby vaporizing the working fluid. The working fluid then travels back to the condensing side 108 via one or more of differential pressure or convection. According to this process, vaporized natural gas 107 evolves from the LNG 105 and is directed back into the outlet side 126b of the fuel line on the use side of the vaporizer 142.

As shown, in some embodiments, the heat source 150 may be positioned below the vaporizer 142 such that the two-phase heat transfer device 101 extends vertically (e.g., an angle above horizontal such as between about 45° and about 135°). In such an embodiment, the vaporized working fluid travels upwards to the vaporizer 142 via convection or pressure differential and the condensed working fluid travels downward to the heat source 150 by gravity upon cooling at the condensing side. In this way the two-phase heat transfer device 101 may function similar to a knockback condenser or a thermosyphon. In such an embodiment, a wick is not necessary and the two-phase heat transfer device does not have a wick therein. In another embodiment (not shown), the vaporizer 142, the heat source 150, and the two-phase heat transfer device 101 may be horizontally arranged. In such an embodiment, a wick may be necessary to provide for capillary transport of the working fluid between the condensing side 108 and the evaporation side 110. In an embodiment, the two-phase heat transfer device 101—in either a vertical or horizontal configuration—may optionally include the wick 104.

In an embodiment, the condensing side 108 can be in fluid communication with a reservoir having non-condensable gas therein. During operation, non-condensable gas evolved from the heating and cooling of the two-phase heat transfer device and working fluid may be swept into the reservoir by the evaporated working fluid traveling toward the condensing side. Suitable non-condensable gases can include nitrogen, argon, helium, etc. The reservoir and non-condensable gas may work to vary the length of the two-phase heat transfer device that conducts heat by providing a vapor block at the condensing side, thus varying the effective length, speed, or efficiency of the two-phase heat transfer device to provide a selected or variable temperature and pressure profile in the two-phase heat transfer device. Such configurations may be useful in situations where the ambient temperature necessitates varying temperature profiles in the vaporizer 142 due to ambient temperature effects (e.g., drastic swings in ambient temperature between night and day) or to limit the minimum temperature in the evaporator section 110 (e.g., prevent freezing on the exterior of evaporator). According to the embodiments herein, a pump or compressor is not required to move the working fluid from one side of a two-phase heat transfer device to another side of the two-phase heat transfer device. More specific embodiments utilizing the above system are described in detail below.

Figure 2:
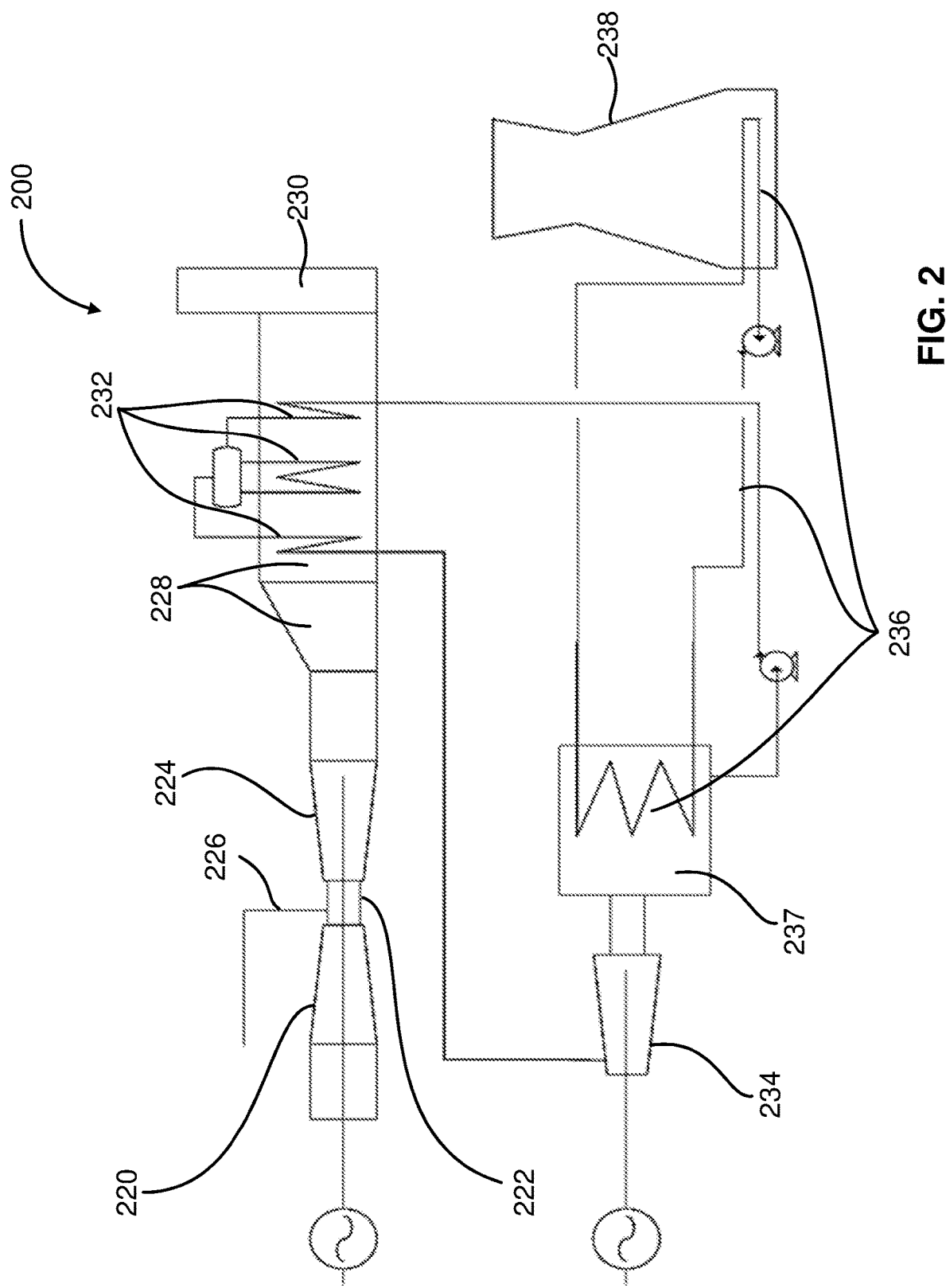
FIG. 2 is a schematic diagram of a basic combined cycle power plant.

FIG. 2 is a schematic diagram of a basic combined cycle power plant 200. The combined cycle power plant 200 includes a compressor 220 (e.g., gas turbine compressor) which takes in and compresses air to use in a combustion chamber 222 associated with a gas turbine 224. An inlet side 226 of a fuel line feeds fuel to the combustion chamber 222. Hot exhaust or flue gases are vented from the gas turbine 224 through a flue 228 to a stack 230 or other exhaust channel. The hot exhaust or flue gases may be used to heat water for use in steam generation via one or more heat exchangers 232 positioned downstream of the gas turbine 224. The heat exchangers may be in fluid communication with a steam turbine 234, such that the steam produced in the heat exchangers 232 is used to turn the steam turbine 234, thereby generating power. The steam exhaust from the steam turbine 234 is then cooled in a heat exchange system 236 fluidly coupled with a cooling tower 238. The cooled water is then recycled from the condenser vessel 237 and back to the heat exchangers 232 for reuse in the power plant 200. A major drawback of the combined cycle plant 200 is that when LNG is the fuel source, it must be converted to a gaseous form prior to combustion, which is typically performed by one of the methods discussed in the background section above, along with the many associated drawbacks described. The systems and methods described herein provide an energy efficient, environmentally responsible, and low maintenance solution to the need for volatilizing a liquefied fuel from a liquid to a gaseous state, notably in LNG fed systems.

While the systems below are described with reference to LNG and propane as the liquefied fuel/working fluid pair, the systems described herein are not limited to such a liquefied fuel/working fluid pair. Further liquefied fuel and working fluids may include, but not be limited to one or more of, LNG/propylene, LNG/R-13, LNG/R-500, ethane/propane, LPG/propane, LPG/R-13, LPG/butane. Working fluid can also be a blend of one or more refrigerants, such as propane, propylene, R-13, R-500, and/or butane.

Figure 3:
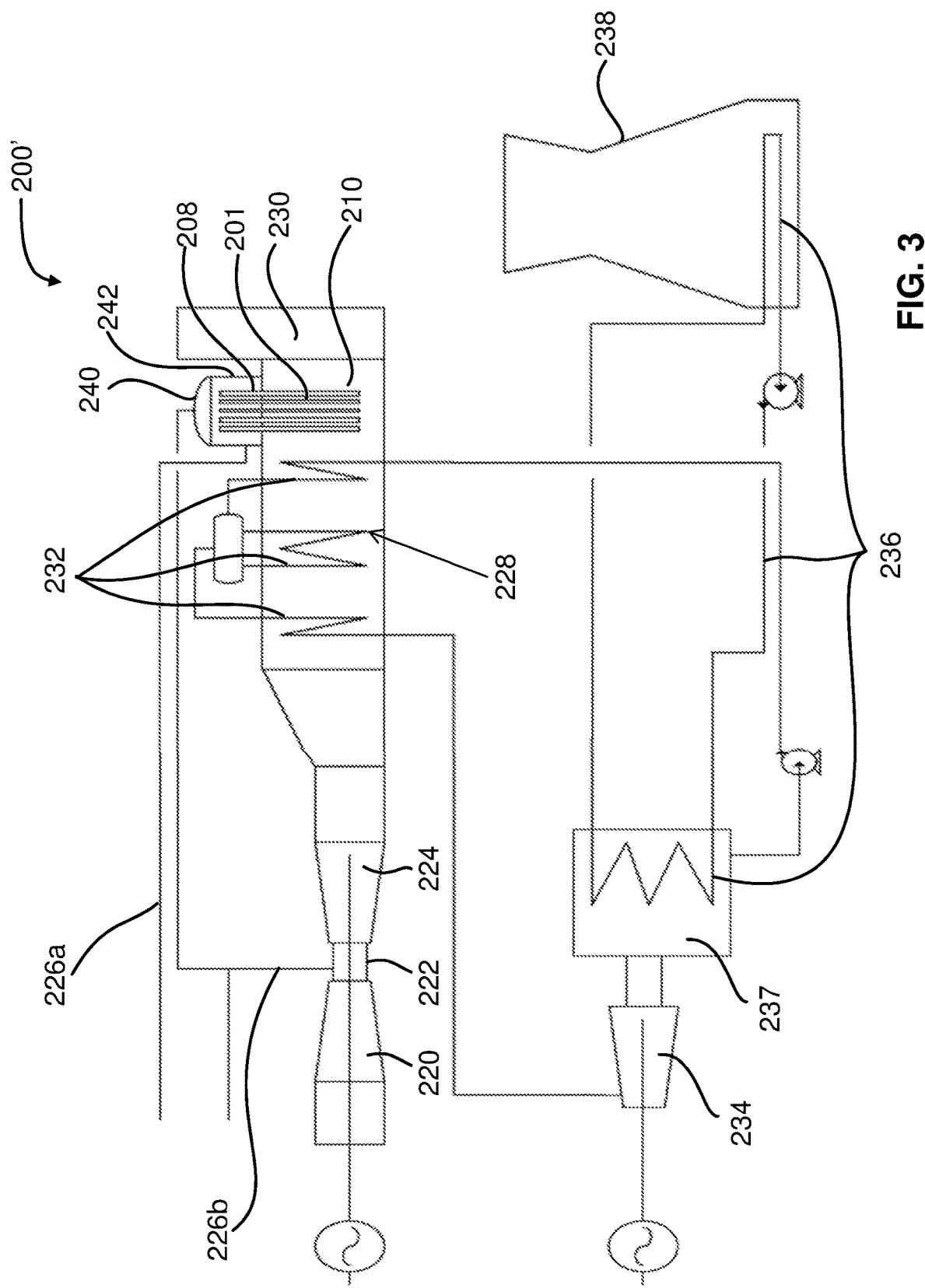
FIG. 3 is a schematic diagram of a combined cycle power plant including a vaporizer system having one or more of the two-phase heat transfer devices, such as that shown in FIG. 1B, according to an embodiment.

FIG. 3 is a schematic diagram of a combined cycle power plant 200' substantially similar to the combined cycle power plant 200 shown in FIG. 2, with like parts having like numbering. The combined cycle power plant 200' includes a fuel line having an inlet side 226a that may contain liquefied fuel and an outlet side 226b that may contain vaporized fuel feeding combustion chamber 222 of the gas turbine 224. The inlet side 226a may be routed through a vaporizer system 240 using one or more two-phase heat transfer devices 201 therein. The one or more two-phase heat transfer devices 201 may be configured similarly or identical to two-phase heat transfer device 101 described herein. In an embodiment, the one or more two-phase heat transfer devices 201 may include propane as a working fluid therein, and the liquefied fuel may be LNG. As shown in FIG. 3, the fuel line may include the inlet side 226a (e.g., first supply-side portion) which feeds into vaporizer 242. The vaporizer 242 is a part of the vaporizer system 240. The vaporizer 242 is a fluid tight vessel that may include the condensing sides 208 of one or more two-phase heat transfer devices 201 therein and is configured to contain the LNG, vaporized natural gas, and the pressures produced therefrom.

The LNG may enter the vaporizer 242 as a liquid at atmospheric pressure or greater, such as about 5 psig to about 220 psig, about 200 psig to about 500 psig, or about 500 psig to about 1400 psig. The LNG may enter the vaporizer 242 as a liquid at a temperature at or below about −82° C. (e.g., about −187° C. or less) and may exit the vaporizer as vaporized natural gas at a temperature of about −82° C. or more, such as at −42° C. or more or at ambient temperature (e.g., about 0° C. or more). Depending on the pressure in the vaporizer and/or the purity or composition of the LNG, the LNG may remain a liquid at higher temperatures than at atmospheric pressure or if pure methane is used. In some embodiments, the vaporized natural gas may exit the vaporizer at a temperature different than the ambient vaporization temperature (e.g., a higher temperature). The vaporized natural gas may be fed into an outlet side 226b of the fuel line through the vaporizer 242, terminating at the combustion chamber 222 or another end use site (e.g., pipeline to another piece of equipment or storage). The vaporized natural gas is then combined with the compressed air from the compressor 220 and combusted to turn the gas turbine 224 to generate power. As described above the hot exhaust or flue gasses from the gas turbine 224 may be used to make steam in the heat exchangers 232 for use in the steam turbine 234.

The evaporation side 210 of the two-phase heat transfer devices 201 may also be in thermal communication with (e.g., exposed to) the hot exhaust or flue gasses thereby evaporating the propane therein. The evaporated propane may then circulate to the condensing side 208 by convection (particularly in vertical configurations) or pressure differential whereby it may exchange heat with the LNG in the vaporizer 242 to vaporize the LNG. The propane condenses and travels to the evaporation side 210 of the two-phase heat transfer device 201, thereby starting the cycle over. In the embodiment shown, the evaporation side 210 of the one or more two-phase heat transfer devices 201 is disposed within and coupled to a flue 228.

Figure 4:
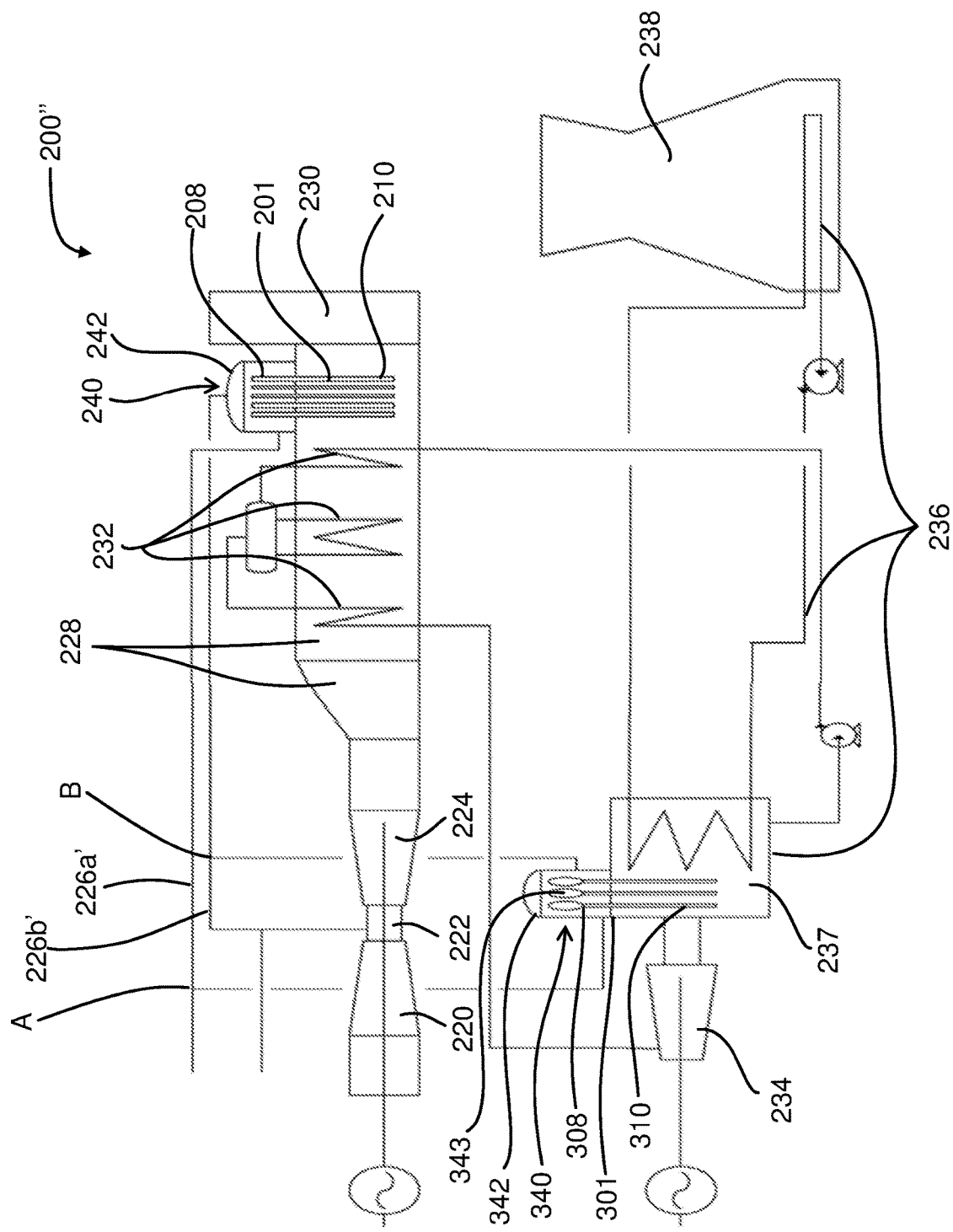
FIG. 4 is a schematic diagram of a combined cycle power plant including two vaporizer systems having one or more of the two-phase heat transfer devices, such as that shown in FIG. 1B, according to an embodiment.

FIG. 4 illustrates a combined cycle power plant 200" substantially similar to the combined cycle power plant 200' shown in FIG. 3, with like parts having like numbering. The combined cycle power plant 200" includes an inlet side of a 226a' fuel line which is first routed through a vaporizer system 240 using one or more two-phase heat transfer devices 201 identical or substantially similar to that described and shown in FIG. 3. The inlet side 226a' of the fuel line also includes a diversion line at junction A. The diversion line includes an inlet side 227a that carries the liquefied fuel to a second vaporizer system 340 and an outlet side 227b that carries vaporized fuel to an end-use site. The second vaporizer system 340 includes a vaporizer 342 having one or more two-phase heat transfer devices 301 therein. The vaporizer 342 may be substantially similar to the vaporizer 242. For example, LNG is fed into the vaporizer 342 from an inlet side 227a (e.g., supply side) of the diversion line where it is vaporized. The one or more two-phase heat transfer devices 301 in the vaporizer 342 may be substantially similar or identical to any two-phase heat transfer devices described herein, such as two-phase heat transfer devices 201. For example, the condensing side 308 of the one or more two-phase heat transfer devices 301 may be disposed in the vaporizer 342. The propane (gas) in the condensing side 308 of the one or more two-phase heat transfer devices 301 may exchange heat with the LNG to vaporize the LNG in the vaporizer, thereby condensing the propane causing it to travel to the evaporation side 310 of the two-phase heat transfer device 301. As shown, the condensing side 308 of the one or more two-phase heat transfer devices 301 may optionally include a non-condensable gas reservoir 343. The non-condensable gas reservoir 343 may be used to control the temperature, efficiency, or speed at which the two-phase heat transfer devices 301 heat the liquefied fuel in the vaporizer 342, such as to prevent condensation or freezing therein.

The vaporized natural gas may then be fed into an outlet side 227*b* of diversion line which joins the outlet side 226*b*' of the fuel line at junction B prior to the outlet side 226*b*' of the fuel line feeding into the combustion chamber 222. In an embodiment, the outlet side 227*b* of the diversion line may feed directly into the combustion chamber 222 and/or another apparatus which requires natural gas fuel.

As described above, the hot exhaust or flue gasses from the turbine 224 may be used to make steam in the heat exchangers 232 for use in the steam turbine 234. The steam from the steam turbine 234 passes into the condensing vessel 237 of the heat exchange system 236. In the power plant 200''', the evaporation side 310 of the one or more two-phase heat transfer devices 301 may also be exposed to the steam exhaust from the steam turbine such as in the condensing vessel 237 thereby evaporating the propane therein. The evaporated propane may then circulate to the condensing side 308 by convection (particularly in vertical configurations) or pressure differential whereby it may exchange heat with the LNG in the vaporizer 342 to vaporize the LNG which condenses and travels to the evaporation side 310 of the two-phase heat transfer device 201, thereby starting the cycle over. As shown, the evaporation side 310 of the one or more two-phase heat transfer devices 301 may be disposed within the condensing vessel 237 to harvest the waste/low-grade heat therein. In an embodiment, the evaporation side 310 of the one or more two-phase heat transfer devices 301 may be disposed in a steam exhaust line prior to the condensing vessel 237. The vaporizer system 340, allows for harvesting even more low-grade heat produced at a combined cycle power plant.

Figure 5:
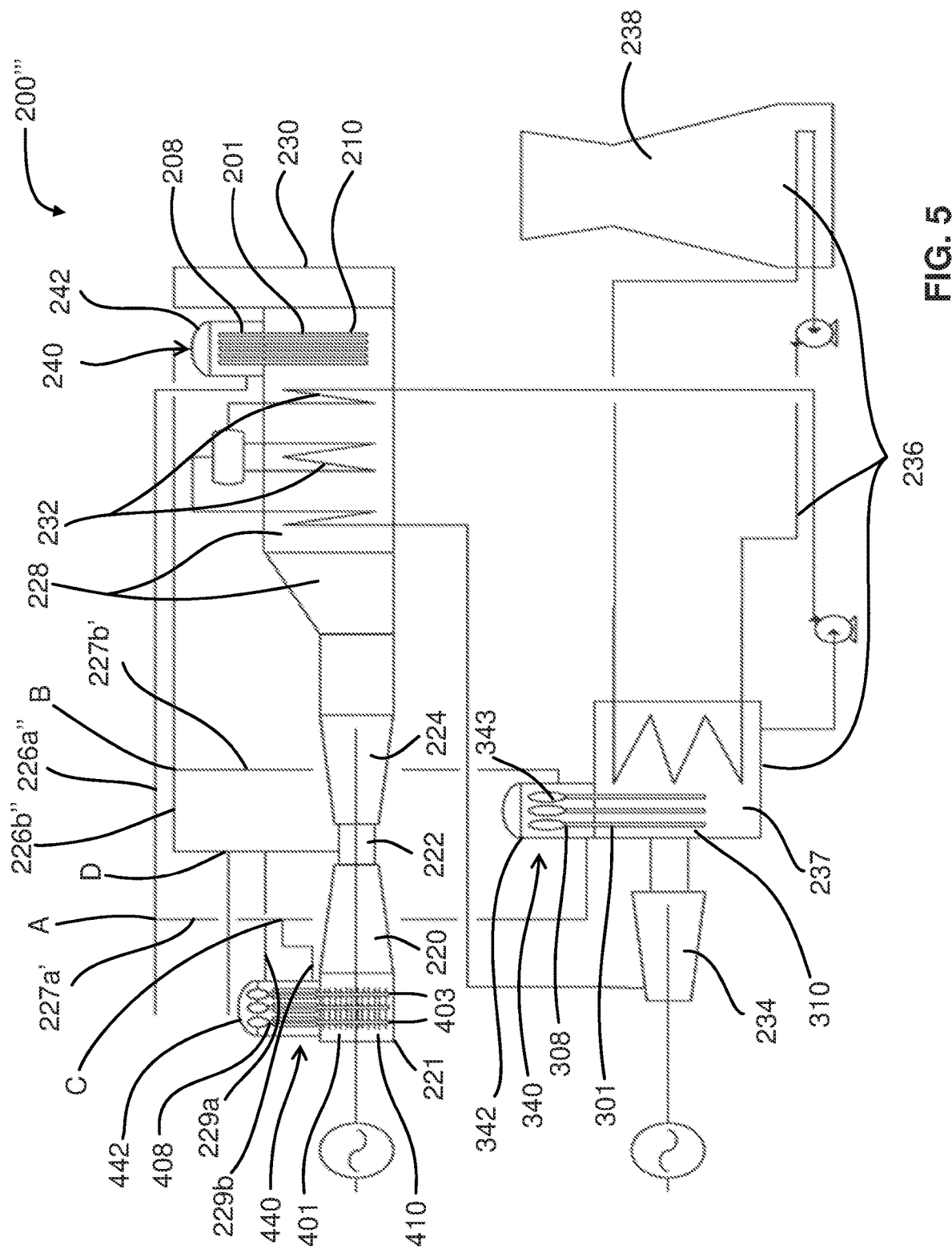
FIG. 5 is a schematic diagram of a combined cycle power plant including three vaporizer systems having one or more of the two-phase heat transfer devices, such as that shown in FIG. 1B, according to an embodiment.

In an even more efficient use of the waste or low-grade heat produced at a combined cycle power plant, the warm intake air going into a compressor 220 can be used to vaporize LNG. As shown in FIG. 5, the combined cycle power plant 200''' is substantially similar to the combined cycle power plant 200'' shown in FIG. 4, with like parts having like numbering. The combined cycle power plant 200''' includes a fuel line having an inlet side 226*a*'' and an outlet side 226*b*'', which is first routed through a vaporizer system 240 using one or more two-phase heat transfer devices 201 identical or substantially similar to that described and shown in FIG. 3. The fuel line also includes a diversion line at junction A. The diversion line may include the inlet side 227*a*' that leads to a second vaporizer system 340 as describe above with respect to FIG. 4, where the LNG is vaporized as described above. The vaporized natural gas may then be fed into an outlet side 227*b*' of diversion line which joins the outlet side 226*b*'' of the fuel line at junction B prior to outlet side 226*b*'' of the fuel line feeding into the combustion chamber 222.

The diversion line also includes a secondary diversion line at junction C in the inlet side 227*a*' of the diversion line. The secondary diversion line may include in inlet side 229*a* carrying liquefied fuel and an outlet side 229*b* carrying vaporized fuel. The inlet side 229*a* of the secondary diversion line leads to a third vaporizer system 440. The third vaporizer system 440 includes a vaporizer 442 having one or more two-phase heat transfer devices 401 therein. The vaporizer 442 may be substantially similar to the vaporizer 242 or 342. For example, LNG is fed into the vaporizer 442 by the inlet side 229*a* of the secondary diversion line, where it is vaporized. The one or more two-phase heat transfer devices 401 in the vaporizer 442 may be substantially similar or identical to any two-phase heat transfer devices describe herein, such as two-phase heat transfer devices 201. For example, the condensing side 408 of the one or more two-phase heat transfer devices 401 may be disposed in the vaporizer 442. The propane (gas) in the condensing side 408 of the one or more two-phase heat transfer devices 401 may exchange heat with the LNG to vaporize the LNG in the vaporizer 442, thereby condensing the propane causing it to travel to the evaporation side 410 of the two-phase heat transfer device 401. The vaporized natural gas may then be fed into an outlet side 229*b* of secondary diversion line which joins the outlet side 226*b*'' of the fuel line at junction D prior to the outlet side 226*b*'' feeding into the combustion chamber 222. In an embodiment, the outlet side 229*b* of the secondary diversion line may feed directly into the combustion chamber 222 or another apparatus which requires natural gas fuel.

In the power plant 200''', the evaporation side 410 of the one or more two-phase heat transfer devices 401 may be positioned within a warm air intake 221 for the compressor 220 to harvest the low-grade heat drawn therein. Warm air (e.g., ambient air or air having a temperature above that of the evaporation point of the liquefied fuel and/or working fluid) drawn into warm air intake 221 of the compressor 220 may be used to heat the evaporation side 410 of the one or more two-phase heat transfer devices 401 thereby evaporating the propane therein. The evaporated propane may then circulate to the condensing side 408 by convection or pressure differential whereby it may exchange heat with the LNG in the vaporizer 442 to vaporize the LNG which condenses and travels (e.g., falls) to the evaporation side 410 of the two-phase heat transfer device 401, thereby starting the cycle over. As shown in FIG. 5, the two-phase heat transfer devices 401 may include extending features 403 attached to or integral with the two-phase heat transfer device. The extending features 403 may include protrusions extending from the jacket of the one or more two-phase heat transfer devices 401 and may include one or more of flutes, fins, splines or other feature extending from the surface of the jacket of a two-phase heat transfer device 401. In an embodiment, one or more of the two-phase heat transfer devices 201, 301, or 401 may include extending features 403.

Figure 6:
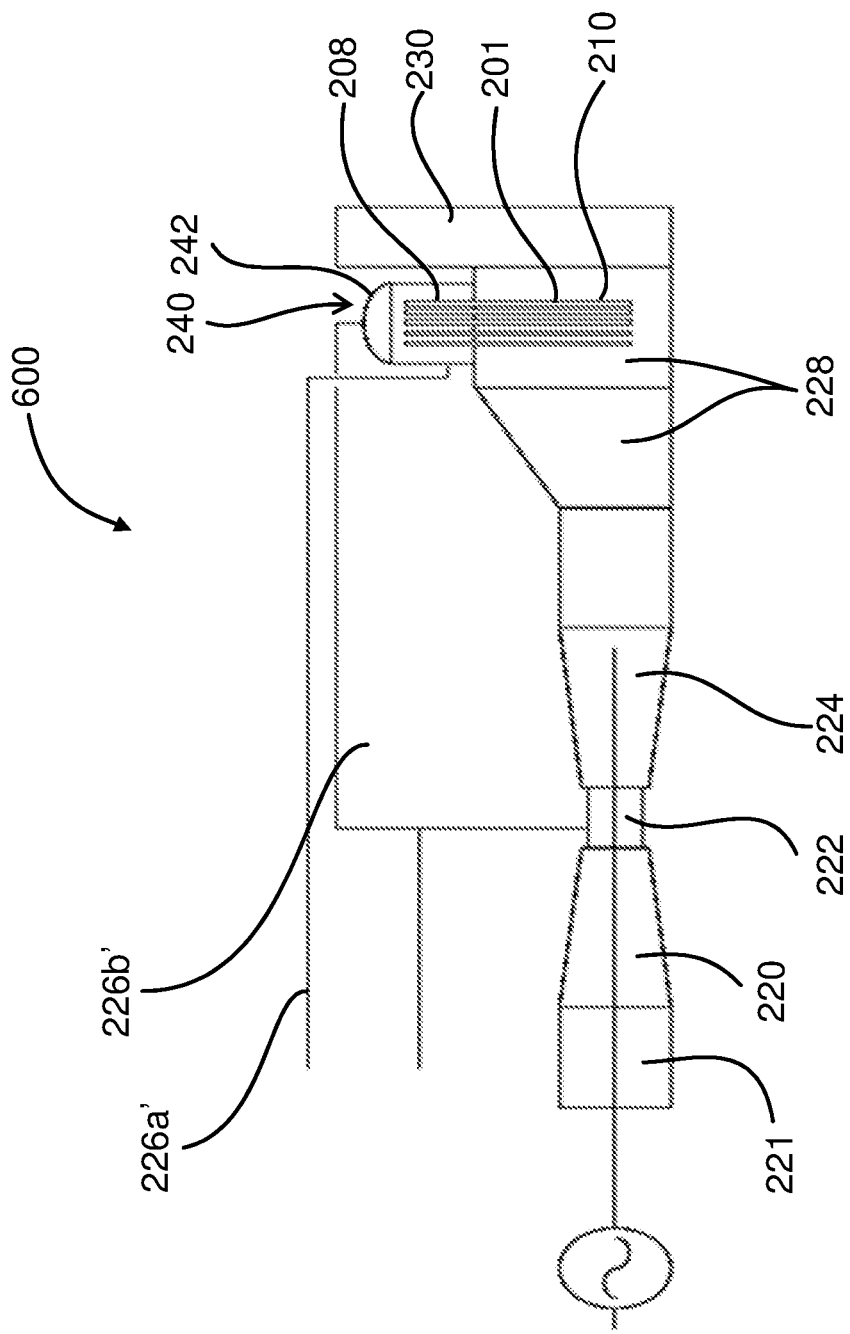
FIG. 6 is a schematic diagram of a vaporizer system including one or more of the two-phase heat transfer devices, such as that shown in FIG. 1B, integrated with a single cycle gas turbine power plant according to an embodiment.

FIG. 6 is a schematic diagram of a vaporizer system 240 integrated with a single cycle gas turbine power plant 600. The single cycle gas turbine power plant 600 can include one or more components identical or substantially similar to the power plant 200' described above with respect to FIG. 3, with like parts having like numbering. The single cycle gas turbine power plant 600 includes warm air intake 221 coupled to a compressor 220 which feeds compressed air into a combustion chamber 222 positioned between the compressor 220 and the gas turbine 224. The compressed air is used to combust fuel in the combustion chamber 222 to turn the gas turbine 224. The hot exhaust or flue gas may be directed through a duct, such as flue 228, stack 230, or other exhaust channel where it may be used to vaporize the liquefied fuel (e.g., LNG) prior to combustion. The single cycle gas turbine power plant 600 includes the fuel line having an inlet side 226*a*' which is first routed through a vaporizer system 240, and an outlet side 226*b*' which may feed vaporized fuel to an end-use site. The vaporizer 242 may include one or more two-phase heat transfer devices 201 therein. The one or more two-phase heat transfer devices 201 may be configured similar or identical to two-phase heat transfer device 101. In an embodiment, the one or more two-phase heat transfer devices 201 may include propane as a working fluid, and the process fluid may be LNG. The fuel line may include an inlet side 226a' (e.g., supply-side portion) which feeds liquefied fuel into vaporizer 242 of the vaporizer system 240. The LNG exits the vaporizer as vaporized natural gas after exposure to the condensing side 208 of the two-phase heat transfer devices 201. The vaporized natural gas may be fed into an outlet side 226b' of the fuel line through the vaporizer 242. The outlet side 226b' may terminate at the combustion chamber 222, another end use site, a larger fuel supply line, or storage. The vaporized natural gas is then combined with the compressed air from the compressor 220 and combusted to turn the gas turbine 224 to generate power. The evaporation sides 210 of the one or more two-phase heat transfer devices 201 are disposed within the flue 228 where they are exposed to the hot exhaust or flue gasses thereby evaporating the propane therein. The evaporated propane may then circulate to the condensing side 208 by convection or pressure differential whereby it may exchange heat with the LNG in the vaporizer 242 to vaporize the LNG. The propane condenses and travels (e.g., via gravity, capillary action via the wick, pressure differential, or any other motivation means) to the evaporation side 210 of the two-phase heat transfer device 201, thereby starting the cycle over.

Figure 7:
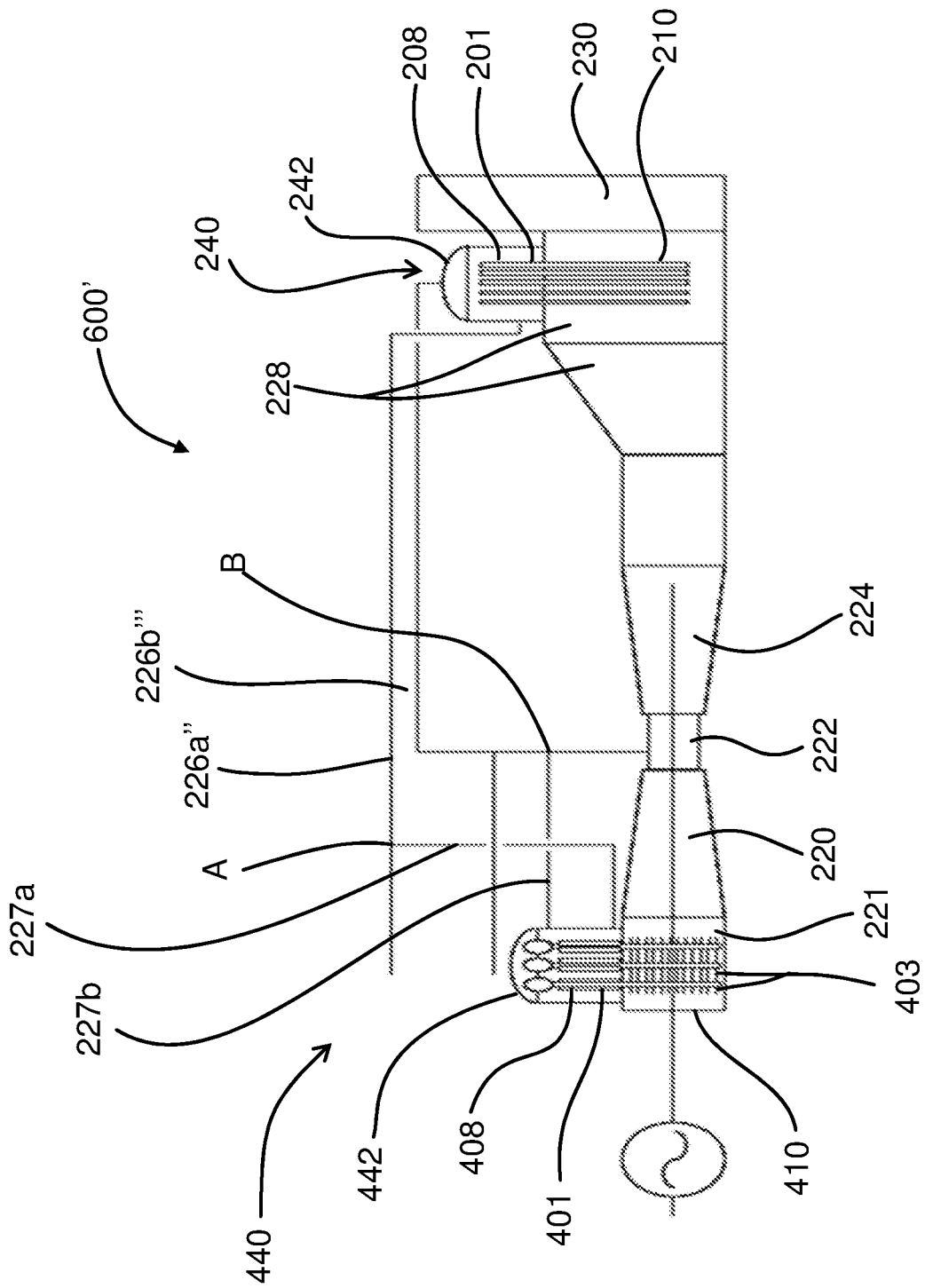
FIG. 7 is a schematic diagram of two vaporizer systems including one or more of the two-phase heat transfer devices, such as that shown in FIG. 1B, integrated with a single cycle gas turbine power plant according to an embodiment.

FIG. 7 is a schematic diagram of vaporizer systems 240 and 440 integrated with a single cycle gas turbine power plant 600', vaporizer system 240 utilizing the hot flue gas to vaporize the LNG, and vaporizer system 440 utilizing warm inlet air to the compressor to vaporize the LNG. The single cycle gas turbine power plant 600' may be substantially similar to the single cycle gas turbine power plant 600, with like parts having like numbering. The single cycle gas turbine power plant 600' includes the vaporizer system 240 substantially as described above with respect to FIG. 6 and the single cycle gas turbine power plant 600, including the fuel line having an inlet side 226a" and outlet side 226b" leading into and out of the vaporizer system 240, respectively. The single cycle gas turbine power plant 600' further includes the diversion line having an inlet side 227a which diverts LNG flow from the fuel line at junction A, directing the LNG to the vaporizer system 440 and directs the vaporized natural gas from the vaporizer system 440 via the outlet side 227b. The vaporizer system 440 includes the vaporizer 442 having one or more two-phase heat transfer devices 401 therein. The vaporizer 442 and/or two-phase heat transfer devices 401 may be identical to the vaporizer 442 two-phase heat transfer devices 401 described above with respect to FIG. 5 and combined cycle power plant 200'. For example, the vaporizer 442 may be positioned on or adjacent to the warm air intake 221 of the compressor 220 of the gas turbine 224. The condensing side 408 of the one or more two-phase heat transfer devices 401 may extend into the vaporizer 442 and the evaporation side 410 of the two-phase heat transfer devices may into the warm air intake 221 where warm air may pass over the evaporation side 410 thereby exchanging heat with the propane therein, cause the propane to evaporate and circulate to the condensing side 408. At the condensing side 408, the evaporated propane exchanges heat with LNG in the vaporizer 442, causing the LNG to vaporize and causing the propane to condense and cycle back to the evaporation side 410. The vaporized natural gas may be directed out of the vaporizer 442 through the use-side 227b of the diversion line which rejoins the outlet side 226" of the fuel line at junction B prior to the combustion chamber 222. As shown, the one or more two-phase heat transfer devices 401 (or 201) may include extending features 403 thereon. The extending features 403 may be similar or identical to any extending features disclosed herein.

Figure 8:
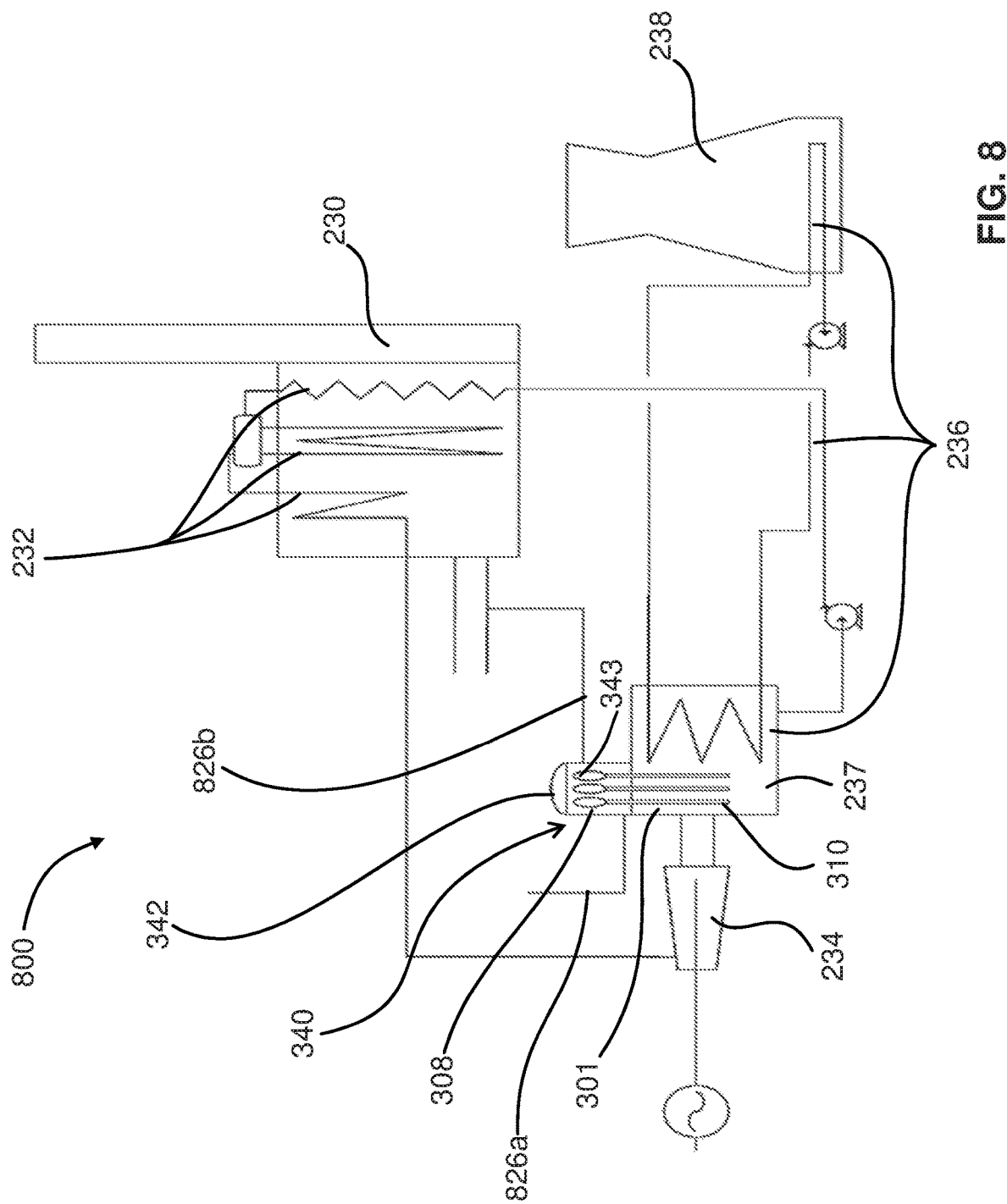
FIG. 8 is a schematic diagram of vaporizer system including one or more of the two-phase heat transfer devices, such as that shown in FIG. 1B, integrated with a thermal cycle power plant utilizing steam discharged from the steam turbine to vaporize a liquefied fuel according to an embodiment.

FIG. 8 is a schematic diagram of a vaporizer system 340 integrated with a thermal cycle power plant 800 utilizing steam discharged from the steam turbine to vaporize LNG. The thermal cycle power plant 800 includes one or more heat exchangers 232 configured to produce steam for driving a steam turbine 234. The steam exhaust from the steam turbine 234 is directed to a condensing vessel 237. The condensing vessel 237 includes a portion of the heat exchange system 236 configured to cool and condense the steam back to liquid which is pumped back to the heat exchangers 232 for reuse in the power plant 800. A vaporizer system 340 may be included in the thermal cycle power plant 800. The vaporizer system 340 may include a fuel line having an inlet side 826a feeding liquefied fuel into the vaporizer 342 and an outlet side 826b carrying vaporized fuel out of the vaporizer 342. The vaporizer 342 may include one or more two-phase heat transfer devices 301 therein. The vaporizer 342 and the one or more two-phase heat transfer devices 301 may be identical or substantially similar to any vaporizer and/or one or more two-phase heat transfer devices described herein. The vaporizer 342 may be positioned on or adjacent to the condensing vessel 237 such that the one or more two-phase heat transfer devices 301 include the condensing side 308 extending into or adjacent to at least a portion of the vaporizer 342 and the evaporation side 310 may extend into or adjacent to at least a portion of the condensing vessel 237. Such a configuration may allow the two-phase heat transfer devices 301 to effectively transfer heat from the steam exhaust of the steam turbine 234 to the LNG via propane working fluid in the two-phase heat transfer devices 301, thereby vaporizing the LNG. The vaporized natural gas may then be directed into the outlet side 826b of the fuel line for delivery to an end-use site (e.g., on-site natural gas fueled equipment, thermal plant 800 boiler).

Figure 9:
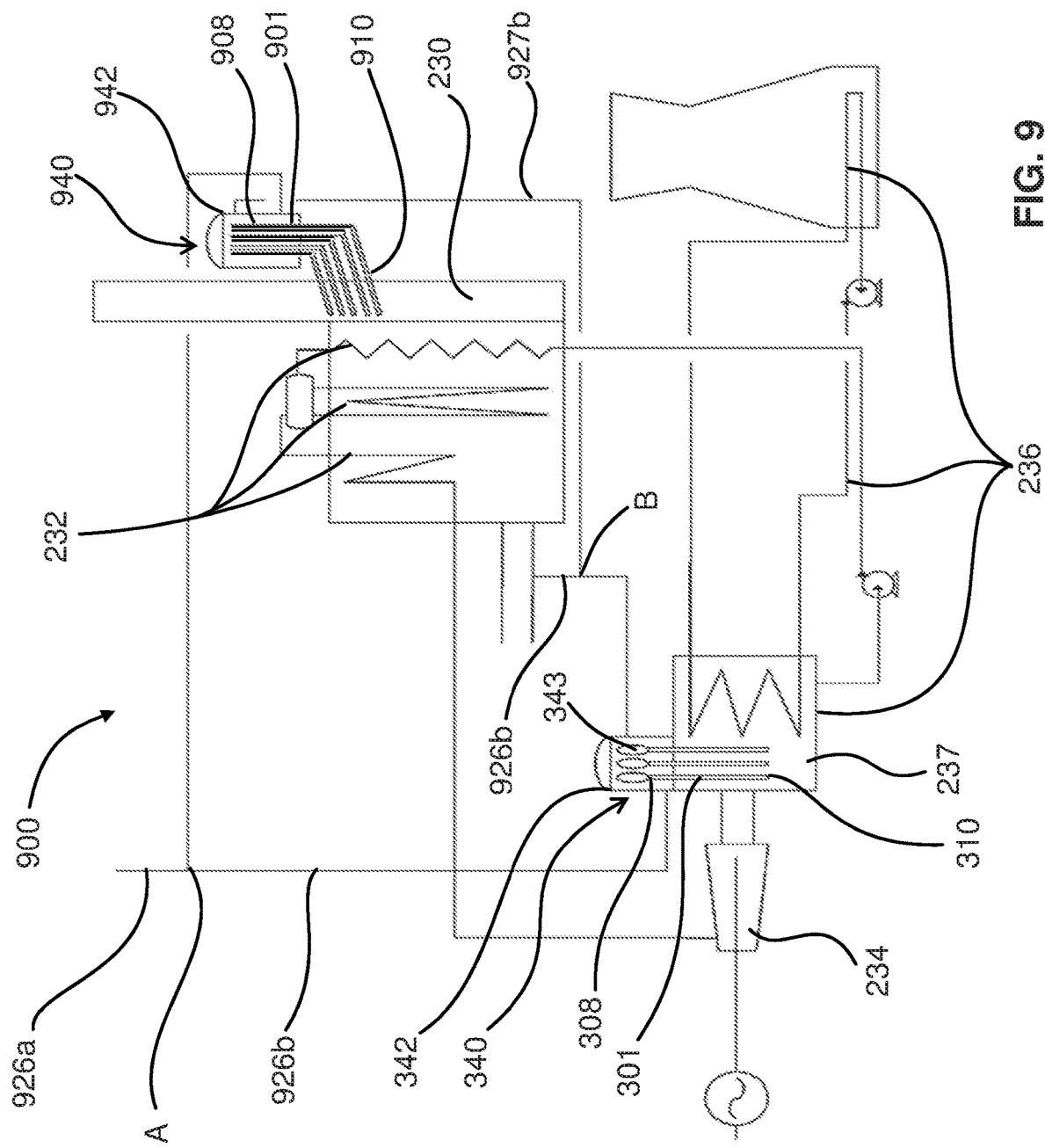
FIG. 9 is a schematic diagram of a thermal cycle power plant including two vaporizer systems having one or more of the two-phase heat transfer devices shown in FIGS. 1A(i) and 1A(ii), and 1B integrated therein according to an embodiment.

FIG. 9 is a schematic diagram of a thermal cycle power plant 900, including two vaporizer systems integrated therein, with the vaporizer system 340 utilizing steam discharged from the steam turbine 234 to vaporize the LNG, and the vaporizer system 940 utilizing the hot flue gas to vaporize the LNG. The thermal cycle power plant 900 includes the vaporizer system 340 associated with the steam turbine 234 substantially as described above with respect to FIG. 8. The vaporizer system 340 is fed with liquefied fuel (e.g., LNG) via the inlet side 926a of a fuel line and vaporized natural gas exits the vaporizer system 340 at an outlet side 926b of the fuel line. A diversion line having an inlet side 927a and an outlet side 927b diverts LNG from the inlet side 926a of the fuel line at junction A, wherein the LNG is direct into the vaporizer 942 of the vaporizer system 940. The vaporizer 942 includes or more two-phase heat transfer devices 901 associated therewith. The vaporizer 942 may be positioned outside of or adjacent to the exterior of a flue or stack 230. The vaporizer 942 may include at least a portion of the condensing side 908 of the one or more two-phase heat transfer devices 901 therein or adjacent thereto. The working fluid in the one or more two-phase heat transfer devices 901 may be propane, wherein the evaporated propane in the condensing side 908 of the one or more two-phase heat transfer devices exchanges heat with the LNG to vaporize the LNG, also resulting in condensation of the propane thereby causing the condensed propane to cycle to the evaporation side 910. The evaporation side 910 of the one or more two-phase heat transfer devices 901 may extend into a duct, e.g., a flue or stack 230 of a power plant wherein hot flue gasses may exchange heat with the condensed propane therein, thereby evaporating the propane causing it to cycle back to the condensing side 908. The one or more two-phase heat transfer devices 901 may be positioned in one or more portions of the flue or stack 230, such as at or near the heated fluid inlet of the flue or stack 230, at or near the heated fluid outlet, or after one or more heat exchangers 232.

As depicted, the one or more two-phase heat transfer devices 901 may have a substantially vertical orientation having one or more bends therein. In such an embodiment, the evaporated propane may travel to the top condensing side 908 of the one or more two-phase heat transfer devices 901 in the vaporizer 942 external to the stack 230 through convection or pressure differential, and the condensed propane may travel to the evaporation side 910 which may be internal to the flue to stack 230 via one or more of gravity, capillary flow, pressure differential, or acceleration forces. The vaporized natural gas may be directed out of the vaporizer 942 into the outlet side 927b of the diversion line, which connects to fuel line outlet side 926b of the fuel line at junction B where the vaporized natural gas is directed to an end-use site (e.g., on-site equipment that uses natural gas or local pipeline system). One or both of the condensing side or the evaporation side of the two-phase heat transfer devices described herein can include extending features thereon. The extending features increase the effective surface area of the one or more two-phase heat transfer devices to transfer larger amounts of heat. Extending features may be particularly useful in vaporizing systems utilizing gas-to-jacket interfaces as opposed to liquid-to-jacket interfaces.

Figure 10:
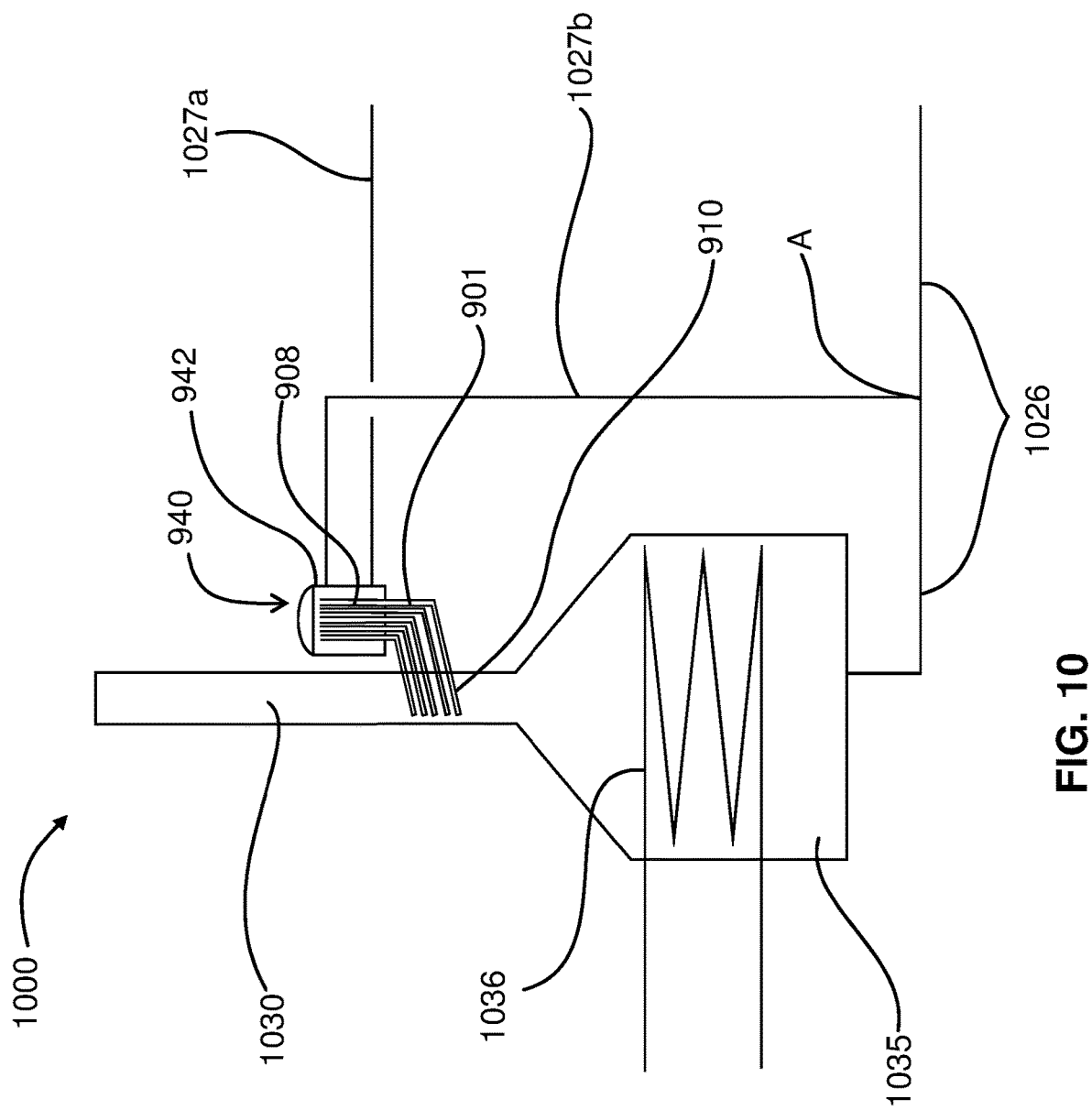
FIG. 10 is a schematic diagram of a vaporizer system including one or more of the two-phase heat transfer devices, such as that shown in FIG. 1B, integrated with an industrial heater according to an embodiment.

FIG. 10 is a schematic diagram of a system 1000 including a vaporizer system 940 integrated with an industrial heater 1035 (e.g., boiler, furnace, tank heater, etc.) utilizing the hot flue gas to vaporize the liquefied fuel. The industrial heater 1035 may include one or more of a heat exchanger 1036 therein or a stack 1030 extending therefrom, the stack 1030 being used to vent hot flue gasses from the industrial heater 1035. The industrial heater 1035 may be fed with fuel from the first fuel line 1026. The fuel may be natural gas. The natural gas may be in the form of LNG which may be routed through a vaporizer system 940 via an inlet side 1027a of a second fuel line prior to use in the industrial heater 1035. The vaporizer system 940 may be identical or substantially similar to the system 940 describe above with respect to FIG. 9. For example, the vaporizer system 940 may include a vaporizer 942 and one or more two-phase heat transfer devices associated with the stack 1030 and vaporizer 942 in a similar or identical manner as that described with respect to stack 230 and vaporizer 942 in FIG. 9. The vaporized natural gas may be routed out of the vaporizer 942 into the outlet side 1027b of the second fuel line which joins the first fuel line 1026 at junction A. The vaporized natural gas may be used as fuel in the industrial heater 1035 and/or be sent to other end-use sites (e.g., on-site natural gas fired equipment). The industrial heater 1035 may further include a heat exchanger 1036 therein, whereby the vaporized fuel may be used to heat another fluid therein.

Figure 11:
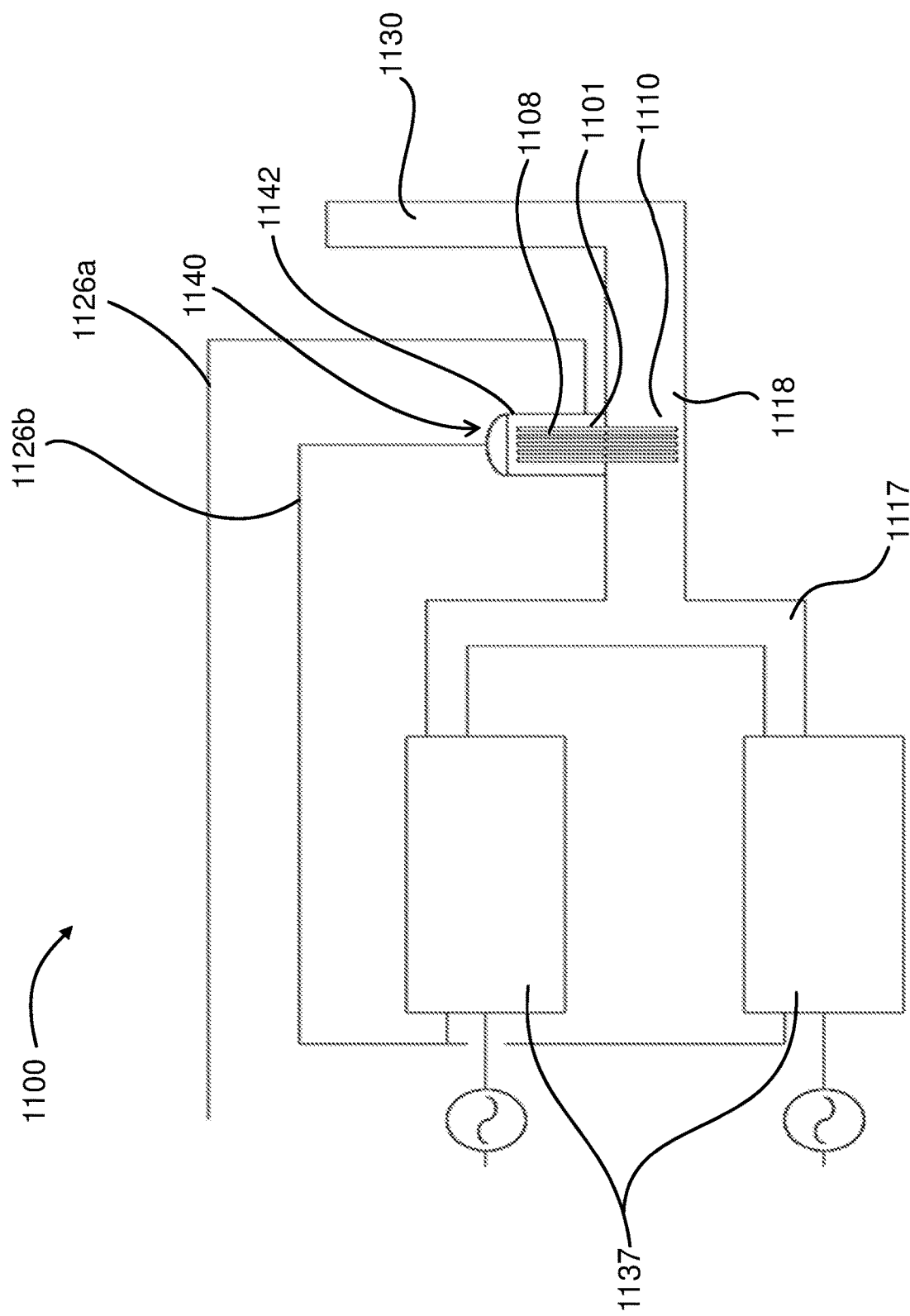
FIG. 11 is a schematic diagram of a vaporizer system including one or more of the two-phase heat transfer devices, such as that shown in FIG. 1B, integrated with two engine driven generators according to an embodiment.

FIG. 11 is a schematic diagram of a system 1100 including vaporizer system 1140 integrated with two engine driven generators 1137 utilizing the combined hot exhaust gas therefrom to vaporize a liquefied fuel. The exhaust ports of one or more engine driven generators 1137 may be fluidly connected to a manifold 1117, the manifold 1117 may converge hot exhaust gasses produced in the one or more engine driven generators 1137 in a flue 1118 which may further fluidly connect to a stack 1130. Portions of the vaporizer system 1140 may be disposed in one or more ducts (e.g., the manifold 1117, flue 1118, and/or stack 1130. As shown, the vaporizer system 1140 may be associated with the flue 1118. The vaporizer 1142 may be positioned at or near the flue 1118. The vaporizer system 1140 may include one or more two-phase heat transfer devices 1101, including at least a portion of condensing side 1108 of the one or more two-phase heat transfer devices 1101 extending into or adjacent to the vaporizer 1142. The evaporation side 1110 of the one or more two-phase heat transfer devices 1101 may extend into or adjacent to one or more ducts, such as the flue 1118 (as shown), the manifold 1117, or the stack 1130. The evaporation side 1110 may be exposed to a warmer fluid (e.g., exhaust or flue gases) in the flue 1118, wherein the warmer fluid exchanges heat with the propane in the one or more two-phase heat transfer devices 1101 thereby evaporating the working fluid, such as propane, therein. The evaporated propane travels to the condensation side 1108 in the vaporizer 1142 wherein heat is exchanged between the evaporated propane and the LNG supplied thereto by the inlet side 1126a of the fuel line, thereby vaporizing the LNG and condensing the propane. The condensed propane travels to the evaporation side 1110 starting the cycle over. The vaporized LNG is then directed to the outlet side 1126b of the fuel line for use in the one or more engine driven generators 1137.

Figure 12:
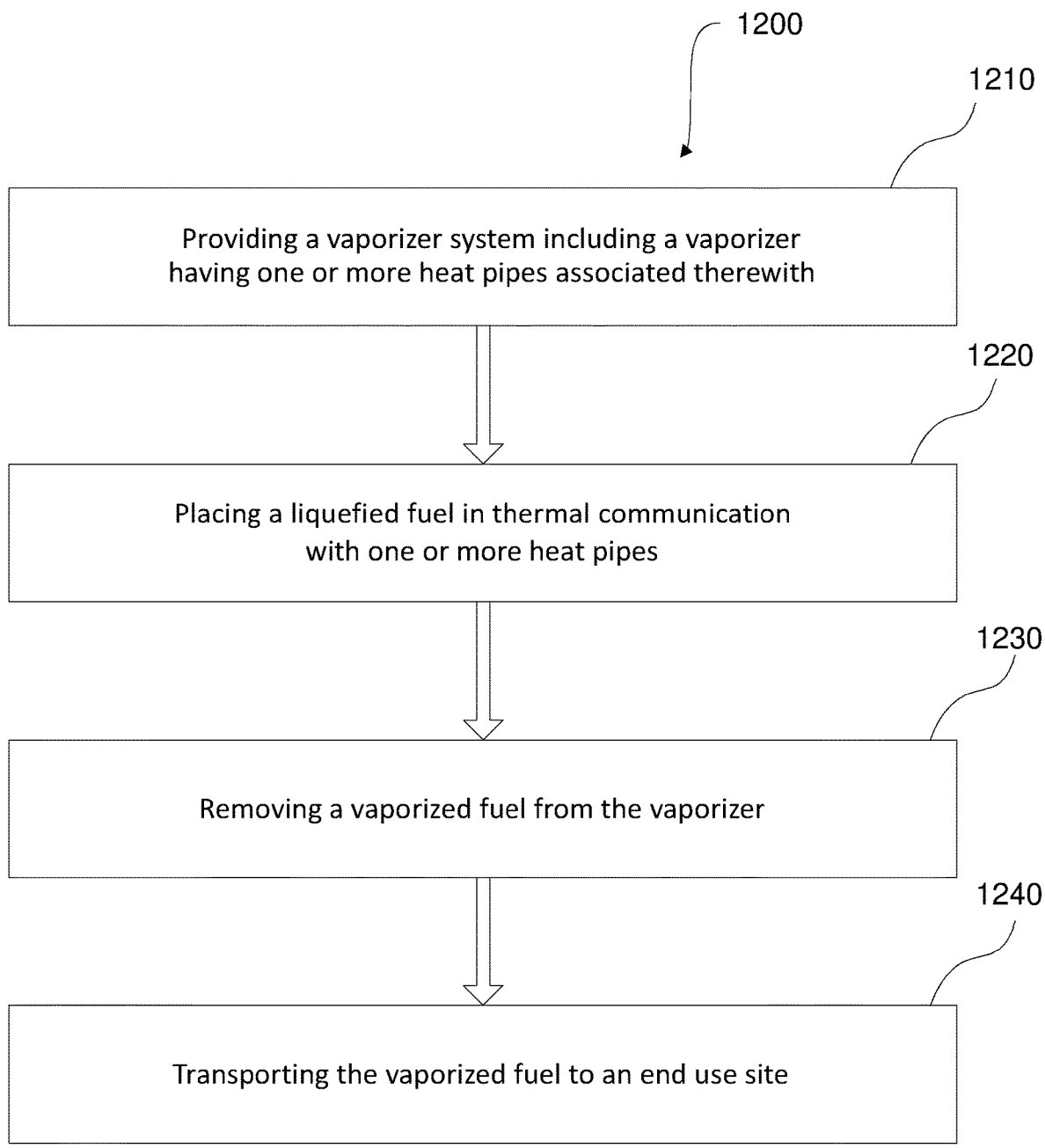
FIG. 12 is a flow diagram of a method of vaporizing a liquefied fuel, according to an embodiment.

In FIG. 12, a flow diagram of a method 1200 of vaporizing a liquefied fuel (e.g., liquid natural gas, liquefied petroleum gas) is shown. The method 1200 includes the act 1210 of providing a vaporizer system including a vaporizer having one or more two-phase heat transfer devices associated therewith. For example, the one or more two-phase heat transfer devices may include a portion protruding into or adjacent to a portion of the vaporizer and a second portion protruding into or adjacent to a fluid source that is warmer than the working fluid. The one or more two-phase heat transfer devices include a working fluid (e.g., propane) selected and configured to transfer heat in a selected temperature range. The method 1200 includes the act 1220 of placing a liquefied fuel (e.g., LNG) in thermal communication with one or more two-phase heat transfer devices, such as by feeding the liquefied fuel into the vaporizer. The method further includes the act 1230 of removing the vaporized fuel from the vaporizer. The method may optionally include transporting the vaporized fuel (now in gaseous form) to an end use site (e.g., on-site fuel consuming equipment) such as via a pipe line or fuel line. The method may optionally include using more than one vaporizer in a single system (e.g., two or three vaporizers in a combined cycle power plant), which may include using any of the embodiments described herein. The method may additionally include using (e.g., combusting, reacting, processing, etc.) the vaporized LNG.

In an embodiment, a method of vaporizing LNG may be carried out by first providing a vaporizing system including a vaporizer having the condensing side of one or more two-phase heat transfer devices disposed therein. The one or more two-phase heat transfer devices may include propane for use as a working fluid. LNG may be fed into the vaporizer via a supply line, where the LNG may contact the condensing ends of the one or more two-phase heat transfer devices thereby condensing the propane, and vaporizing the LNG. The propane does not freeze in the low temperatures necessary for natural gas to exist in liquefied form. The condensed propane travels to the evaporation side of the two-phase heat transfer device which is in thermal communication with the warmer fluid, thereby causing the condensed propane to evaporate and travel back to the condensing side. The relatively low temperature of propane allows the condensed propane to readily absorb heat from the surrounding environment. The vaporized natural gas is then removed from the vaporizer via a pipe or fuel line. The pipe or fuel line may connect to a furnace, turbine, boiler, or other end use site, where the natural gas may be burned as fuel.

The systems and methods described herein eliminate the need for pre-vaporization of LNG prior to delivery to an LNG fueled power plant, thereby allowing direct use of LNG at power plants and a smaller footprint for fuel storage systems. Further, by harvesting the waste or low-grade heat from hot exhaust gasses, the systems and methods described herein can reduce or eliminate visible pollution such as steam plumes or stacks.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A system for vaporizing a liquefied fuel, the system comprising:
   a combustion chamber and a steam turbine;
   a first duct coupled to and configured to receive exhaust from the combustion chamber and a second duct coupled to and configured to receive exhaust from the steam turbine;
   a heat exchanger coupled to the first duct and configured to produce steam for turning the steam turbine using heat from the exhaust that passes through the first duct;
   first and second evaporators, each configured for vaporization of a liquefied fuel and comprising a tank that:
      has an inlet configured to couple to a liquefied fuel source and an outlet configured for gaseous fuel to exit the tank, wherein the inlet is in fluid communication with the outlet; and
      is configured to hold liquefied fuel received through the inlet of the tank; and
   first and second two-phase heat transfer devices, each comprising a jacket, the jacket having a first end and a second end and defining a chamber therebetween, the jacket configured to contain a working fluid;
   wherein the first two-phase heat transfer device is configured:
      (i) to couple to the first evaporator such that the first end of the jacket is in thermal communication with liquefied fuel in the tank,
      (ii) to couple to the first duct such that the second end of the jacket is in thermal communication with the exhaust that passes through the first duct, and
      (iii) such that the working fluid can circulate between the first end and the second end as the working fluid transitions between a gas phase and a liquid phase; and
   wherein the second two-phase heat transfer device is configured:
      (i) to couple to the second evaporator such that the first end of the jacket is in thermal communication with liquefied fuel in the tank,
      (ii) to couple to the second duct such that the second end of the jacket is in thermal communication with the exhaust that passes through the second duct, and
      (iii) such that the working fluid can circulate between the first end and the second end as the working fluid transitions between a gas phase and a liquid phase.

2. The system of claim 1, wherein at least one of the first and second two-phase heat transfer devices is a heat pipe or a vapor chamber.

3. The system of claim 1, wherein, for at least one of the first and second two-phase heat transfer devices, the jacket is configured to be vacuum-sealed.

4. The system of claim 1, wherein, for at least one of the first and second two-phase heat transfer devices, the jacket comprises a thermally conductive material, wherein the conductivity of the material is at least 200 W m−1 K−1.

5. The system of claim 1, wherein, for at least one of the first and second two-phase heat transfer devices, the jacket comprises a plurality of outer surface protrusions.

6. The system of claim 1, wherein at least one of the first and second two-phase heat transfer devices further comprises a wick disposed on at least a portion of an interior surface of the jacket.

7. The system of claim 1, further comprising, for at least one of the first and second two-phase heat transfer devices, a reservoir configured to be in fluid communication with the jacket and configured to contain a non-condensable gas.

8. The system of claim 1, wherein at least one of the first and second two-phase heat transfer devices is configured to couple to the respective one of the first and second ducts such that the first end is above the second end.

9. The system of claim 1, wherein, for at least one of the first and second evaporators, liquefied fuel is disposed in the tank, and the liquefied fuel is liquefied natural gas.

10. The system of claim 1, further comprising, for at least one of the first and second evaporators, a fuel line configured to deliver gaseous fuel from the outlet of the tank to the combustion chamber.

11. The system of claim 1, further comprising:
   a gas turbine coupled to and configured to receive exhaust from the combustion chamber;
   wherein the first duct is configured to receive exhaust from the combustion chamber via the gas turbine.

12. The system of claim 1, wherein at least one of the first and second two-phase heat transfer devices is configured:

to couple to the respective one of the first and second evaporators such that the first end of the jacket contacts liquefied fuel in the tank; and to couple to the respective one of the first and second ducts such that the second end of the jacket is disposed within the respective one of the first and second ducts and contacts exhaust that passes through the respective one of the first and second ducts.

13. The system of claim 1, wherein, for at least one of the first and second two-phase heat transfer devices, the working fluid:

is disposed within the chamber; and comprises a refrigerant having a boiling point that is between $-100°$ C. and $0°$ C. and a melting point that is less than $-170°$ C.

14. The system of claim 1, wherein, for at least one of the first and second two-phase heat transfer devices, the working fluid is disposed within the chamber and has a boiling point that is between $-100°$ C. and $0°$ C. and a melting point that is less than $-170°$ C.

15. The system of claim 14, wherein, for at least one of the first and second two-phase heat transfer devices, the working fluid comprises at least one of propane and propylene.

\* \* \* \* \*